(12) United States Patent
Tsukagoshi

(10) Patent No.: US 12,425,656 B2
(45) Date of Patent: Sep. 23, 2025

(54) TRANSMITTING DEVICE, TRANSMITTING METHOD, RECEIVING DEVICE, AND RECEIVING METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 56 days.

(21) Appl. No.: 18/077,550

(22) Filed: Dec. 8, 2022

(65) Prior Publication Data
US 2023/0104968 A1     Apr. 6, 2023

Related U.S. Application Data

(63) Continuation of application No. 16/736,218, filed on Jan. 7, 2020, now Pat. No. 11,575,866, which is a
(Continued)

(30) Foreign Application Priority Data

Apr. 30, 2013    (JP) ................................. 2013-096056

(51) Int. Cl.
*H04N 19/70*      (2014.01)
*H04N 5/38*      (2006.01)
(Continued)

(52) U.S. Cl.
CPC ............. *H04N 19/70* (2014.11); *H04N 5/38* (2013.01); *H04N 5/57* (2013.01); *H04N 7/08* (2013.01);
(Continued)

(58) Field of Classification Search
None
See application file for complete search history.

(56) References Cited

U.S. PATENT DOCUMENTS

| | | | | | |
|---|---|---|---|---|---|
| 5,534,948 | A | * | 7/1996 | Baldwin | ................ H04N 5/205 |
| | | | | | 348/254 |
| 6,100,938 | A | * | 8/2000 | Ha | ........................ H04N 5/202 |
| | | | | | 348/E5.076 |

(Continued)

FOREIGN PATENT DOCUMENTS

| | | |
|---|---|---|
| CN | 1571472 | 1/2005 |
| CN | 102349290 | 2/2012 |

(Continued)

OTHER PUBLICATIONS

Bross, Benjamin, et al., "High Efficiency Video Coding (HEVC) text specification draft 10 (for FDIS & Last Call)"; Joint collaborative Team on Video Coding (JCT-VC) of ITU-T SG 16 WP 3 and ISO/IEC JTC 1/2C 29/WG 11 12$^{th}$ Meeting; Geneva, CH, Jan. 14-23, 2013.

(Continued)

*Primary Examiner* — Justin W Rider
(74) *Attorney, Agent, or Firm* — Richard LaPeruta

(57) ABSTRACT

Display with an appropriate luminance dynamic range is realizable on a receiving side. A gamma curve is applied to input video data having a level range from 0% to 100%*N (N: a number larger than 1) to obtain transmission video data. This transmission video data is transmitted together with auxiliary information used for converting a high-luminance level on the receiving side. A high-level side level range of the transmission video data is converted on the receiving side such that a maximum level becomes a predetermined level based on the auxiliary information received together with the transmission video data.

20 Claims, 40 Drawing Sheets range_max_percent * 100 = 400
monitor luminance dynamic range = 400

Mapping to full range

Decoded luminance     Output luminance
                         percentage              percentage ① highest level      100   ⟶   400

② 2nd highest level    98   ⟶   300

③ 3rd highest level    96   ⟶   200

Related U.S. Application Data continuation of application No. 15/829,388, filed on Dec. 1, 2017, now Pat. No. 10,560,674, which is a continuation of application No. 14/784,353, filed as application No. PCT/JP2014/060877 on Apr. 16, 2014, now Pat. No. 9,860,505.

(51) Int. Cl.
| | |
|---|---|
| H04N 5/57 | (2006.01) |
| H04N 7/08 | (2006.01) |
| H04N 9/64 | (2023.01) |
| H04N 9/69 | (2023.01) |
| H04N 19/46 | (2014.01) |
| H04N 19/85 | (2014.01) |
| H04N 21/236 | (2011.01) |
| H04N 21/431 | (2011.01) |
| H04N 21/434 | (2011.01) |
| H04N 21/84 | (2011.01) |
| H04N 23/741 | (2023.01) |

(52) U.S. Cl.
CPC ............ *H04N 9/641* (2013.01); *H04N 9/69* (2013.01); *H04N 19/46* (2014.11); *H04N 19/85* (2014.11); *H04N 21/23614* (2013.01); *H04N 21/4318* (2013.01); *H04N 21/4348* (2013.01); *H04N 21/84* (2013.01); *H04N 23/741* (2023.01)

(56) References Cited

U.S. PATENT DOCUMENTS

| | | | | |
|---|---|---|---|---|
| 8,111,333 | B2* | 2/2012 | Luo | H04N 5/202 348/674 |
| 8,279,351 | B2* | 10/2012 | Bakhmutsky | H04N 9/69 345/589 |
| 9,014,504 | B2* | 4/2015 | Lim | H04N 25/611 348/222.1 |
| 9,554,056 | B2* | 1/2017 | Touze | H04N 23/743 |
| 9,860,505 | B2 | 1/2018 | Tsukagoshi | |
| 10,609,327 | B2* | 3/2020 | Tsukagoshi | H04N 21/434 |
| 11,394,920 | B2* | 7/2022 | Tsukagoshi | H04N 19/46 |
| 2001/0015774 | A1* | 8/2001 | Endo | H04N 9/73 348/708 |
| 2004/0196394 | A1* | 10/2004 | Nakajima | H04N 5/202 348/254 |
| 2007/0132866 | A1* | 6/2007 | Lee | H04N 1/60 348/254 |
| 2008/0094493 | A1* | 4/2008 | Igarashi | H04N 23/72 348/254 |
| 2008/0231688 | A1* | 9/2008 | Luo | H04N 7/152 382/167 |
| 2009/0010538 | A1* | 1/2009 | Kim | H04N 5/202 382/167 |
| 2010/0201887 | A1* | 8/2010 | Bakhmutsky | H04N 5/202 348/E5.074 |
| 2010/0328490 | A1* | 12/2010 | Kurane | H04N 25/583 348/584 |
| 2012/0020413 | A1* | 1/2012 | Chen | H04N 19/61 375/240.26 |
| 2012/0162463 | A1 | 6/2012 | Doida | |
| 2013/0083838 | A1* | 4/2013 | Touze | H04N 19/33 375/E7.026 |
| 2013/0195204 | A1* | 8/2013 | Reznik | H04L 65/756 375/240.26 |
| 2014/0210847 | A1* | 7/2014 | Knibbeler | G11B 20/10 345/589 |
| 2014/0225941 | A1* | 8/2014 | Van der Vleuten | G09G 5/10 345/690 |
| 2014/0341272 | A1* | 11/2014 | Miller | H04N 5/202 375/240.02 |
| 2018/0295318 | A1* | 10/2018 | Tsukagoshi | H04N 7/005 |
| 2019/0007709 | A1* | 1/2019 | Oh | H04N 21/4348 |
| 2020/0296322 | A1* | 9/2020 | Tsukagoshi | H04N 19/70 |
| 2020/0404215 | A1* | 12/2020 | Tsukagoshi | H04N 23/76 |

FOREIGN PATENT DOCUMENTS

| | | |
|---|---|---|
| CN | 102567976 | 7/2012 |
| JP | 2004222178 | 8/2004 |
| JP | 2005-287037 A | 10/2005 |
| JP | 2006-267323 A | 10/2006 |
| JP | 2007-049329 A | 2/2007 |
| JP | 2009-017172 A | 1/2009 |
| RU | 244661 C1 | 3/2012 |
| WO | 2012035476 | 3/2012 |
| WO | 2012147018 | 11/2012 |
| WO | WO 2013/039730 A2 | 3/2013 |
| WO | 2013052774 | 4/2013 |
| WO | WO 2013/046095 A1 | 4/2013 |

OTHER PUBLICATIONS

Extended Search Report issued in European Patent Application No. 14791888.2 dated Oct. 20, 2016.
Hattori, S., et al., "Signalling of Luminance Dynamic Range in Tone mapping information SEI," *Joint Collaborative Team on Video Coding (JCT-VC) ITU-T SG 16 WP 3 and ISO/IEC JTC 1/SC 29/WG 11*, Oct. 2013, pp. 1-7.
Hattori, S., et al., "HLS: SEI message for transfer function information," *Joint Collaborative Team on Video Coding (JCT-VC) ITU-T SG 16 WP 3 and ISO/IEC JTC 1/SC 29/WG 11*. Nov. 2013, pp. 1-4.
Hattori, S., et al, "HLS: SEI message for Knee Function Information." Joint Collaborative Team on Video Coding (JCT-VC) ITU-T SG 16 WP 3 and ISO/IEC JTC 1/SC 29/WG 11, Jan. 2014, pp. 1-31.
Russian Office Action issued in Russian Patent Application No. 2015145812 dated Aug. 30, 2017 with English Translation.
Zhihua et al., A New Method for High Dynamic Range Image Enhancement Based on Multi-scale Retinex, College of Electrical Engineering and Automation, Anhui University, pp. 19-21, 20100128.

\* cited by examiner

FIG. 13

Tone mapping information SEI message syntax

| | Descriptor |
|---|---|
| tone_mapping_info( payloadSize ) { | |
|   tone_map_id | ue(v) |
|   tone_map_cancel_flag | u(1) |
|   if( !tone_map_cancel_flag ) { | |
|     tone_map_persistence_flag | u(1) |
|     coded_data_bit_depth | u(8) |
|     target_bit_depth | u(8) |
|     tone_map_model_id | ue(v) |
|     if( tone_map_model_id == 0 ) { | |
|       min_value | u(32) |
|       max_value | u(32) |
|     } else if( tone_map_model_id == 1 ) { | |
|       sigmoid_midpoint | u(32) |
|       sigmoid_width | u(32) |
|     } else if( tone_map_model_id == 2 ) { | |
|       for( i = 0; i < ( 1 << target_bit_depth ); i++ ) | |
|         start_of_coded_interval[ i ] | u(v) |
|     else if( tone_map_model_id == 3 ) { | |
|       num_pivots | u(16) |
|       for( i = 0; i < num_pivots; i++ ) { | |
|         coded_pivot_value[ i ] | u(v) |
|         target_pivot_value[ i ] | u(v) |
|       } | |

Tone mapping information SEI message syntax *(continued from previous page)*

| tone_mapping_info( payloadSize ) { | Descriptor |
|---|---|
| // continued from previous page | |
| } else if( tone_map_model_id == 4 ) { | |
|    camera_iso_speed_idc | u(8) |
|    if( camera_iso_speed_idc == EXTENDED_ISO ) | |
|       camera_iso_speed_value | u(32) |
|    exposure_index_idc | u(8) |
|    if( exposure_index_idc == EXTENDED_ISO ) | |
|       exposure_index_value | u(32) |
|    exposure_compensation_value_sign_flag | u(1) |
|    exposure_compensation_value_numerator | u(16) |
|    exposure_compensation_value_denom_idc | u(16) |
|    ref_screen_luminance_white | u(32) |
|    extended_range_white_level | u(32) |
|    nominal_black_level_code_value | u(16) |
|    nominal_white_level_code_value | u(16) |
|    extended_white_level_code_value | u(16) |
|    } | |
|    } | |
| } | |

FIG. 15

Semantics of Tone mapping SEI

Tone mapping_cancel_flag (1bit)
  1 CANCEL MESSAGE STATE OF PREVIOUS Tone mapping
  0 TRANSMIT RESPECTIVE ELEMENTS FOR REFRESHMENT OF PREVIOUS STATE coded_data_bit_depth (8bits)
  BIT LENGTH (8–14 bits) OF ENCODED DATA IS USED target_bit_depth (8bits)
  MAXIMUM bit LENGTH ASSUMED AS output BIT LENGTH OF PROCESS
  BY tone mapping SEI, MAX: 16bits ref_screen_luminance_white
  NOMINAL WHITE LEVEL OF REFERENCE MONITOR, UNIT: cd/m2 extended_range_white_level
  PERCENTAGE OF INTEGER MULTIPLE WHEN nominal white level IS 100% nominal_black_level_code_value
  LUMINANCE SAMPLE VALUE FOR NOMINAL BLACK LEVEL
  BLACK LEVEL IS 16 WHEN video IS ENCODED BY 8bits nominal_white_level_code_value   (w_p)
  LUMINANCE SAMPLE VALUE FOR NOMINAL WHITE LEVEL
  WHITE LEVEL IS 235 WHEN video IS ENCODED BY 8bits extended_white_level_code_value   (ew_p)
  LUMINANCE SAMPLE VALUE OF extended_range_white_level FIG. 16    HDR_conversion SEI message syntax

| Syntax | No. of Bits | Format |
|---|---|---|
| HDR_conversion SEI ( ) { | | |
|    HDR_conversion_id | ue(v) | |
|    HDR_conversion_cancel_flag | u(1) | |
|    if( !HDR_conversion_cancel_flag ) { | | |
|       coded_data_bit_depth | 8 | uimslbf |
|       target_bit_depth | 8 | uimslbf |
|       ref_screen_luminance_white | 32 | uimslbf |
|       nominal_white_level_code_value | 16 | uimslbf |
|       nominal_black_level_code_value | 16 | uimslbf |
|       threshold_clipping_level | 16 | uimslbf |
|       operator_type | 8 | bslbf |
|       if(threshold_clipping_level < nominal_white_level_code_value ) | | |
|          level_mapping_curve_type | 8 | bslbf |
|       else | | |
|          reserved | 8 | 0xff |
|       range_max_percent | 8 | uimslbf |
|    } | | |
| } | | |

FIG. 17

HDR_conversion SEI semantics

HDR_conversion_cancel_flag (1bit)
    1  CANCEL MESSAGE STATE OF PREVIOUS HDR conversion
    0  TRANSMIT RESPECTIVE ELEMENTS FOR REFRESHMENT OF PREVIOUS STATE coded_data_bit_depth (8bits)
    BIT LENGTH (8—14 bits) OF ENCODED DATA IS USED target_bit_depth (8bits)
    MAXIMUM bit LENGTH ASSUMED AS output BIT LENGTH OF PROCESS
    BY HDR_conversion SEI, MAX: 16bits ref_screen_luminance_white (32bits)
    cd/m2 VALUE AT 100% OF REFERENCE MONITOR nominal_white_level_code_value (16bits)
    LUMINANCE 100% LEVEL CODE VALUE nominal_black_level_code_value (16bits)
    LUMINANCE 0% LEVEL CODE VALUE threshold_clipping_level (16bits)
    INDICATING THRESHOLD OF LUMINANCE CONVERTED TO CONVENTIONAL ENCODED
    RANGE BY NON-LINEAR tone mapping WITHIN HDR RANGE operator_type (8bits)
    INDICATING FILTER TYPE USED AT LUMINANCE LEVEL Marking EXCEEDING
    threshold_clipping_level level_mapping_curve_type (8bits)
    INDICATING TYPE OF FUNCTION FOR CONVERTING LUMINANCE LEVEL EXCEEDING
    threshold_clipping_level INTO TARGET LUMINANCE LEVEL range_max_percent (8bits)
    INDICATE N OF 100% * N BY 8bits

FIG. 18

HDR_simple descriptor syntax

| Syntax | No. of Bits | Format |
|---|---|---|
| HDR_simple descriptor ( ) { | | |
|     HDR_simple descriptor tag | 8 | uimsbf |
|     HDR_simple descriptor length | 8 | uimsbf |
|     Tonemapping_SEI_existed | 1 | bslbf |
|     HDR_conversion_SEI_existed | 1 | bslbf |
|     reserved | 6 | 0x3f |
| } | | |

FIG. 19

Tonemapping_SEI_existed (1bit)
    INDICATE PRESENCE OF Tonemapping SEI INFORMATION IN VIDEO LAYER
    1    Tonemapping SEI INFORMATION: PRESENT
    0    Tonemapping SEI INFORMATION: ABSENT
HDR_conversion_SEI_existed (1bit)
    INDICATE PRESENCE OF HDR_conversion_SEI INFORMATION IN VIDEO LAYER
    1    HDR_conversion_SEI INFORMATION: PRESENT
    0    HDR_conversion_SEI INFORMATION: ABSENT

FIG. 20

HDR_full descriptor syntax

| Syntax | No. of Bits | Format |
|---|---|---|
| HDR_full descriptor ( ) { | | |
| HDR_full descriptor tag | 8 | uimslbf |
| HDR_full descriptor length | 8 | uimslbf |
| coded_data_bit_depth | 8 | uimslbf |
| target_bit_depth | 8 | uimslbf |
| ref_screen_luminance_white | 32 | uimslbf |
| extended_range_white_level | 32 | uimslbf |
| nominal_black_level_code_value | 16 | uimslbf |
| nominal_white_level_code_value | 16 | uimslbf |
| extended_white_level_code_value | 16 | uimslbf |
| threshold_clipping_level | 8 | bslbf |
| operator_type | 8 | uimslbf |
| range_max_percent | 1 | bslbf |
| Tonemapping_SEI_existed | 1 | bslbf |
| HDR_conversion_SEI_existed | 6 | 0x3f |
| reserved | | |
| } | | |

FIG. 21 level_mapping_curve descriptor syntax

| Syntax | No. of Bits | Format |
|---|---|---|
| level_mapping_curve_descriptor ( ) { | | |
|   level_mapping_curve_descriptor tag | 8 | uimslbf |
|   level_mapping_curve_descriptor length | 8 | uimslbf |
|   mapping_curve_table_id | 8 | bslbf |
|   number of levels N | 16 | uimslbf |
|   number of curve types C | 8 | uimslbf |
|   for ( N = 0; N < number of levels ; N++) | | |
|     for ( C = 0; C < number of curve_types ; C++) | | |
|       curve_data | 16 | uimslbf |
| } | | | id OF TABLE OF mapping_curve_table_id (8) mapping curve
VALUE OF curve_data (16) lebel_mapping_curve

FIG. 23 level_mapping_curve table

| decoded pixel data | DISPLAY LEVEL BY Mapping curve type | | |
|---|---|---|---|
| | (a) | (b) | (c) |
| threshold_clipping_level ($V\_th$) | | | |
| --- | | | |
| --- | | | |
| --- | | | |
| --- | | | |
| --- | | | |
| --- | | | |
| --- | | | |
| --- | | | |
| ...... | | | |
| $V\_100$ | | | |

Decoded pixel data

Clipping
by threshold_clipping_level

Black pixels indicate
discarded by clipping.

Marking
by filtering operator

Non-black pixels are
processed by a filtering
operator.

Mapping
To full range

① highest level
② 2nd highest level
③ 3rd highest level

FIG. 29 Example of range mapping to suitably fit to monitor luminance performance

| | Mapping Level | Decoded luminance percentage | Range_max_percent * 100 | Monitor luminance dynamic range | Output luminance percentage |
|---|---|---|---|---|---|
| Case 1 | Highest level | 100 | 800 | 800 | 800 |
| | 2nd Highest level | SMALLER THAN 100 | | | 400 |
| Case 2 | Highest level | 100 | 400 | 800 | 400 |
| | 2nd Highest level | SMALLER THAN 100 | | | 200 |
| Case 3 | Highest level | 100 | 800 | 400 | 400 |
| | 2nd Highest level | SMALLER THAN 100 | | | 200 |
| Case 4 | Highest level | 100 | 800 | 100 | 100 |
| | 2nd Highest level | SMALLER THAN 100 | | | SMALLER THAN 100 |

FIG. 30

EXAMPLE OF 100% * L (L=2)

| | Max value of decoded pixel data (WHEN 10bits) | Range_max_percent *100 | Monitor luminance dynamic range | Output luminance Percentage VALUE IN PARENTHESES: PRESENTATION WHEN 10bits |
|---|---|---|---|---|
| Case 5 | 960 | 400 | 200 | 200 (480) |

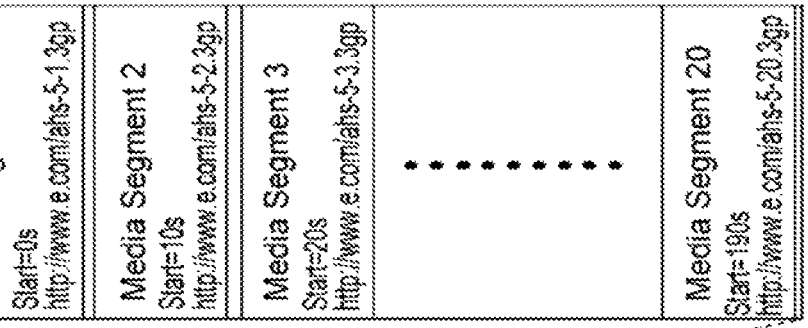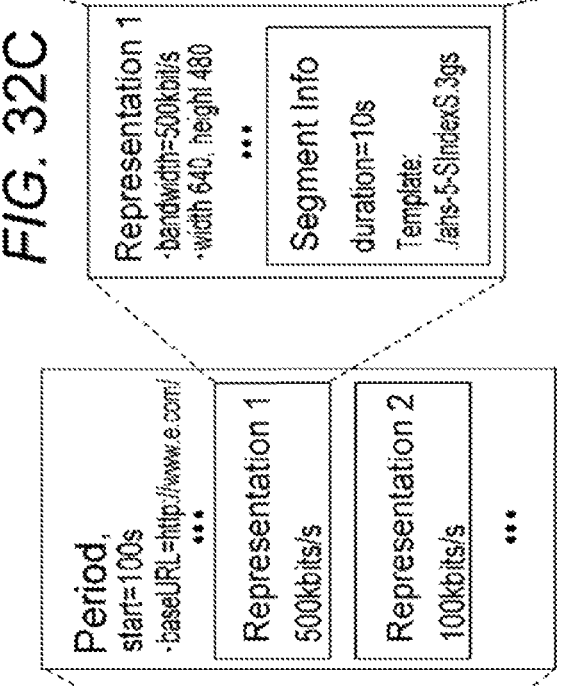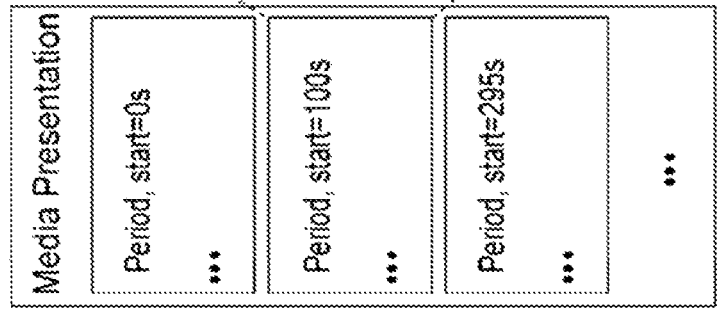

FIG. 37

HDR description Message

| Syntax | No. of Bits | Format |
|---|---|---|
| HDR description message() { | | |
|   message_id | 16 | uimslbf |
|   version | 8 | uimslbf |
|   length | 16 | uimslbf |
|   extension { | | |
|     HDR simple description table() | | |
|   } | | |
| } | | |

FIG. 38

HDR simple description table()

| Syntax | No. of Bits | Format |
|---|---|---|
| HDR simple description_table() { | | |
| table_id | 8 | uimslbf |
| version | 8 | uimslbf |
| length | 16 | uimslbf |
| packet_id | 16 | uimslbf |
| tone_mapping_SEI_existed | 1 | bslbf |
| HDR_conversion_SEI_existed | 1 | bslbf |
| reserved | 6 | bslbf |
| } | | |

FIG. 39

HDR description Message

| Syntax | No. of Bits | Format |
|---|---|---|
| HDR description message() { | | |
| message_id | 16 | uimslbf |
| version | 8 | uimslbf |
| length | 16 | uimslbf |
| extension { | | |
| HDR full description table() | | |
| } | | |
| } | | |

FIG. 40

HDR full description table()

| Syntax | No. of Bits | Format |
|---|---|---|
| HDR full description_table() { | | |
|     table_id | 8 | uimslbf |
|     version | 8 | uimslbf |
|     length | 16 | uimslbf |
|     packet_id | 16 | uimslbf |
|     coded_data_bit_depth | 8 | uimslbf |
|     target_bit_depth | 8 | uimslbf |
|     ref_screen_luminance_white | 32 | uimslbf |
|     extended_range_white_level | 32 | uimslbf |
|     nominal_black_level_code_value | 16 | uimslbf |
|     nominal_white_level_code_value | 16 | uimslbf |
|     extended_white_level_code_value | 16 | uimslbf |
|     threshold_clipping_level | 16 | uimslbf |
|     operator_type | 8 | bslbf |
|     range_max_percent | 8 | uimslbf |
|     Tonemapping_SEI_existed | 1 | bslbf |
|     HDR_conversion_SEI_existed | 1 | bslbf |
|     reserved | 6 | 0x3f |
| } | | |

FIG. 41

HDR description Message

| Syntax | No. of Bits | Format |
|---|---|---|
| HDR description message() { | | |
|   message_id | 16 | uimslbf |
|   version | 8 | uimslbf |
|   length | 16 | uimslbf |
|   extension { | | |
|     Level_mapping_curve_table() | | |
|   } | | |
| } | | |

FIG. 42

Level_mapping_curve table

| Syntax | No. of Bits | Format |
|---|---|---|
| _level_mapping_curve table ( ) { | | |
| table_id | 8 | uimslbf |
| version | 8 | uimslbf |
| length | 16 | uimslbf |
| packet_id | 16 | uimslbf |
| mapping_curve_table_id | 8 | bslbf |
| number of levels N | 16 | uimslbf |
| number of curve types C | 8 | uimslbf |
| for ( N = 0; N < number of levels ; N++) | | |
| for ( C = 0; C < number of curve_types ; C++) | | |
| curve_data | 16 | uimslbf |
| } | | |

TRANSMITTING DEVICE, TRANSMITTING METHOD, RECEIVING DEVICE, AND RECEIVING METHOD

CROSS REFERENCE TO RELATED APPLICATIONS

This application is a continuation of U.S. application Ser. No. 16/736,218, filed Jan. 7, 2022, which is a continuation of U.S. application Ser. No. 15/829,388, filed Dec. 1, 2017, which is a continuation of U.S. Ser. No. 14/784,353, filed Oct. 14, 2015, which is a National Stage of PCT/JP2014/060877, filed Apr. 16, 2014, and claims the benefits of priority under 35 U.S.C. § 119 of Japanese Application No. 2013-096056, filed Apr. 30, 2013. The entire contents of each of the above-identified documents is hereby incorporated by reference.

TECHNICAL FIELD

The present technology relates to a transmitting device, a transmitting method, a receiving device, and a receiving method, and more particularly to a transmitting device and others for transmitting transmission video data obtained by application of a gamma curve.

BACKGROUND ART

Virtual reality of a high-quality image is improvable by increasing a synchronous reproduction ability for synchronous reproduction of a luminance minimum level and a luminance maximum level at the time of image display. This synchronous reproduction ability is sometimes called a display dynamic range.

A conventional standard has been set to a white luminance value of 100 cd/m2 throughout cases from camera-imaging to monitoring display. In addition, a 25 conventional transmission has been set to 8-bit transmission (representable gradations: 0 to 255) as a precondition. The representable gradations are expandable by the use of 10-bit transmission or larger-bit transmission, for example. Gamma correction is further known as a correction of gamma characteristics of a display achieved by input of data having characteristics opposite to the characteristics of the display.

For example, Non-Patent Document 1 describes transmission of a video stream generated by encoding transmission video data which has been obtained by application of a gamma curve to input video data having levels of 0 to 100%*N (N: larger than 1), for example.

CITATION LIST

Non-Patent Document

Non-Patent Document 1: High Efficiency Video Coding (HEVC) text specification draft 10 (for FDIS & Last Call)

SUMMARY OF THE INVENTION

Problem to be Solved by the Invention

An object of the present technology is to realize display with an appropriate luminance dynamic range on a receiving side.

Solutions to Problem

A concept of the present technology is directed to a transmitting device including:
 a processing unit that applies a gamma curve to input video data having a level range from 0% to 100%*N (N: a number larger than 1) to obtain transmission video 30 data; and
 a transmission unit that transmits the transmission video data together with auxiliary information used for converting a high-luminance level on a receiving side.

According to the present technology, the processing unit applies a gamma curve to input video data having a level range from 0% to 100%*N (N: a number larger than 1) to obtain transmission video data. The transmission unit transmits the transmission video data together with auxiliary information used for converting a high-luminance level on a receiving side. For example, the transmission unit may transmit a container in a predetermined format that contains a video stream obtained by encoding the transmission video data. An auxiliary information insertion unit that inserts the auxiliary information into a layer of the video stream and/or a layer of the container may be provided.

For example, according to the present technology, the processing unit may further execute a process for converting a level of output video data obtained by applying the gamma curve to the input video data, which level corresponds to a level of the input video data in a range from 100% to 100%*N, into a level corresponding to 100% of the input video data so as to obtain the transmission video data. In this case, the auxiliary information may contain information on a filter applied to pixel data of the transmission video data at a level corresponding to 100% of the input video data.

For example, according to the present technology, the processing unit may further execute a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data so as to obtain the transmission video data.

In this case, the auxiliary information may contain information on a filter applied to pixel data of the transmission video data in a range from the threshold to a level corresponding to 100% of the input video data.

Alternatively, in this case, the auxiliary information 15 may contain information on a conversion curve applied to pixel data of the transmission video data in a range from the threshold to a level corresponding to 100% of the input video data.

According to the present technology, the processing unit may use output video data as the transmission video data without a change, which output video data is obtained by applying the gamma curve to the input video data. In this case, the auxiliary information may contain information on a conversion curve applied to a high-level side of the transmission video data.

According to the present technology, therefore, the transmission video data obtained by applying the gamma curve to the input video data having the level range from 0% to 100%*N is transmitted together with the auxiliary information used for converting the high-luminance level on the receiving side. Accordingly, the receiving side is capable of converting the high-luminance level of the transmission video data based on the auxiliary information.

For example, video data with a high dynamic range is obtainable by converting transmission video data with a low dynamic range having a level corresponding to 100% level of the input video data as the maximum level such that the maximum level becomes high. In addition, video data with a low dynamic range, for example, is obtainable by converting transmission video data with a high dynamic range having a level corresponding to 100%*N level of the input video data as the maximum level such that the maximum level becomes low. Accordingly, display with an appropriate luminance dynamic range is realizable on the receiving side.

For example, according to the present technology, an identification information insertion unit may be provided. This identification information insertion unit inserts, into the layer of the container, identification information that indicates that the auxiliary information has been inserted into the layer of the video stream. In this case, the receiving side is capable of recognizing insertion of the auxiliary information into this video stream without the necessity of decoding the video stream, and therefore appropriately extracting the auxiliary information from the video stream.

Another concept of the present technology is directed to a receiving device including:
  a reception unit that receives transmission video data obtained by applying a gamma curve to input video data having a level range from 0% to 100%*N (N: a number larger than 1); and
  a processing unit that converts a high-level side level range of the transmission video data such that a maximum level becomes a predetermined level based on auxiliary information received together with the transmission video data.

According to the present technology, the reception unit receives transmission video data. This transmission video data is obtained by applying a gamma curve to input video data having a level range from 0% to 100%*N (N: a number larger than 1). The processing unit converts a high-level side level range of the transmission video data such that a maximum level becomes a predetermined level based on auxiliary information received together with the transmission video data.

For example, the processing unit may determine the predetermined level based on information on the N and information on a luminance dynamic range of a monitor contained in the auxiliary information. For example, the reception unit transmits a container in a predetermined format that contains a video stream obtained by encoding the transmission video data. For example, the auxiliary information is inserted into a layer of the video stream.

For example, according to the present technology, the transmission video data may be video data obtained by further executing a process for converting a level of output video data obtained by applying the gamma curve to 5 the input video data, which level corresponds to a level of the input video data in a range from 100% to 100%*N, into a level corresponding to 100% of the input video data. The processing unit may convert levels of respective pixel data corresponding to 100% of the input 10 video data into levels in a range from a level corresponding to 100% of the input video data to the predetermined level by applying a filter specified in filter information contained in the auxiliary information.

According to the present technology, the transmission video data may be video data obtained by further executing a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data. The processing unit may convert levels of respective pixel data in a range from the threshold to a level corresponding to 100% of the input video data into levels in a range from the threshold to the predetermined level by applying a filter specified in filter information contained in the auxiliary information.

According to the present technology, the transmission video data may be video data obtained by further executing a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data. The processing unit may convert levels of respective pixel data in a range from the threshold to a level corresponding to 100% of the input video data into levels in a range from the threshold to the predetermined level by applying conversion curve information contained in the auxiliary information.

According to the present technology, output video data may be used as the transmission video data without a change, which output video data is obtained by applying the gamma curve to the input video data. The processing unit may convert levels of respective pixel data of the transmission video data in a range from a threshold equal to or lower than a level corresponding 100% of the input video data to a level corresponding to 100%*N of the input video data into levels in a range from the threshold to the predetermined level corresponding to L*100% (L: a number equal to or smaller than N) of the input video data by applying conversion curve information contained in the auxiliary information.

According to the present technology, therefore, the transmission video data obtained by applying the gamma curve to input video data having the level range from 0% to 100%*N is received. Then, the high-level side level range of this transmission video data is converted such that the maximum level becomes the predetermined level, based on the auxiliary information received together with the transmission video data. Accordingly, display with an appropriate luminance dynamic range is realizable, for example.

Effects of the Invention

According to the present technology, display with an appropriate luminance dynamic range is realizable on the receiving side. The effects described in this specification are only presented by way of example, and not given for any purposes of limitations. Other additional effects may be produced.

BRIEF DESCRIPTION OF DRAWINGS

FIG. 13 is a view illustrating a structure example of a tone mapping information SEI message.

FIG. 14 is a view illustrating the structure example of the tone mapping information SEI message.

FIG. 15 is a view illustrating contents of chief 25 information in the structure example of the tone mapping information SEI message.

FIG. 16 is a view illustrating a structure example of an HDR conversion SEI message.

FIG. 17 is a view illustrating contents of chief 30 information in the structure example of the HDR conversion SEI message.

FIG. 18 is a view illustrating a structure example of an HDR simple descriptor.

FIG. 19 is a view illustrating contents of chief information in the structure example of the HDR simple descriptor.

FIG. 20 is a view illustrating a structure example of an HDR full descriptor.

FIG. 21 is a view illustrating a structure example of a level mapping curve descriptor.

FIG. 23 is a view schematically illustrating an example of a mapping curve table.

FIG. 29 is a view illustrating the process of the 30 range mapping processing unit when the filter information is used.

FIG. 30 is a view illustrating a process of the range mapping processing unit when conversion curve information is used.

FIGS. 32A through 32D are views illustrating an example of a relationship between respective structures disposed in an MPD file in a hierarchical manner.

FIG. 37 is a view illustrating a structure example of an HDR description message having an HDR simple description table.

FIG. 38 is a view illustrating a structure example of the HDR simple description table.

FIG. 39 is a view illustrating a structure example of an HDR description message having an HDR full description table.

FIG. 40 is a view illustrating a structure example of the HDR full description table.

FIG. 41 is a view illustrating a structure example of an HDR description message having a level mapping curve table.

FIG. 42 is a view illustrating a structure example 5 of the level mapping curve table.

MODE FOR CARRYING OUT THE INVENTION

A mode for carrying out the invention (hereinafter referred to as "embodiment") is now described. The description is presented in the following order.
1. Embodiment
2. Modified Example

1. EMBODIMENT

Configuration Example of Transmitting and Receiving System

Figure 1:
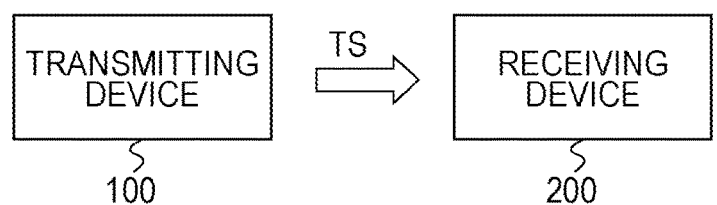
FIG. 1 is a block diagram illustrating a configuration example of a transmitting and receiving system according to an embodiment.

FIG. 1 illustrates a configuration example of a transmitting and receiving system 10 according to an embodiment. The transmitting and receiving system 10 is constituted by a transmitting device 100 and a receiving device 200.

The transmitting device 100 generates an MPEG2 transport stream TS as a container, and transmits the transport stream TS carried on broadcasting waves. The transport stream TS includes a video stream obtained by encoding transmission video data to which a gamma curve has been applied.

According to this embodiment, the transmission video data is obtained by applying a gamma curve to input video data with HDR (High Dynamic Range) which has been obtained by camera-imaging, i.e., input video data having a level range from 0 to 100%*N (N: number larger than 1), for example. It is assumed herein that the 100% level is a luminance level corresponding to a white luminance value of 100 cd/m2.

The transmission video data includes transmission video data (a), transmission video data (b), and transmission video data (c) discussed hereinbelow, for example. The transmission video data (a) and the transmission video data (b) have the maximum level corresponding to the 100% level of input video data, and constitutes video data with a low dynamic range. The transmission video data (c) has the maximum level corresponding to the 100%*N level of input video data, and constitutes video data with a high dynamic range.

"Transmission Video Data (a)"

The transmission video data (a) is herein described with reference to FIG. 2. In this figure, "Content data level range" indicates a level range from 0% to 100%*N of input video data. In this figure, "V_100*N" indicates a level of video data (output video data) corresponding to the 100%*N level of input video data and obtained after application of a gamma curve. In this figure, "V_100" indicates a level of video data (output video data) corresponding to the 100% level of input video data and obtained after application of the gamma curve. In this figure, "Encoder Input Pixel data range" indicates a level range of transmission video data from 0 to V_100. For example, gradations from 0 to V_100 are expressed based on predetermined bits, such as 8 bits.

The transmission video data (a) is obtained by a clipping process (see broken line b) which further converts levels of output video data, which data is obtained by applying a gamma curve (see solid line a) to input video data, and corresponds to levels of input video data in the range from 100% to 100%*N, into levels corresponding to 100% of the input video data (V_100). The transmission video data (a) has levels corresponding to levels of input video data in the range from 0% to 100%, and constitutes video data with a low dynamic range.

"Transmission Video Data (b)"

The transmission video data (b) is herein described with reference to FIG. 3. In this figure, "Content data level range", "V_100*N", and "Encoder Input Pixel data range" are similar to the corresponding ones illustrated in FIG. 2. In this figure, "V_th" indicates a threshold clipping level (Threshold_clipping_level) as a threshold equal to or lower than a level corresponding to the 100% level of input video data.

The transmission video data (b) is obtained by a mapping process which further converts levels of output video data, which data is obtained by applying a gamma curve (see solid line a) to input video data, and lies in a range from a threshold (V_th) equal to or lower than the level corresponding to 100% of the input video data to a level (V_100*N) corresponding to 100%*N of input video data, into levels in a range from the threshold (V th) to the level (V_100) corresponding to 100% of the input video data. The transmission video data (b) has levels corresponding to levels of input video data in the range from 0% to 100%, and constitutes video data with a low dynamic range.

"Transmission Video Data (c)"

The transmission video data (c) is herein described with reference to FIG. 4. In this figure, "Content data level range" and "V_100*N" are similar to the corresponding ones illustrated in FIG. 2. In this figure, "Encoder Input Pixel data range" indicates a level range from 0 to V_100*N of transmission video data. The transmission video data (c) is output video data obtained by applying a gamma curve (see solid line a) to input video data, and not subjected to further processing. The transmission video data (c) has levels corresponding to levels of input video data in the range from 0% to 100%*N, and constitutes video data with a high dynamic range.

Figure 5:
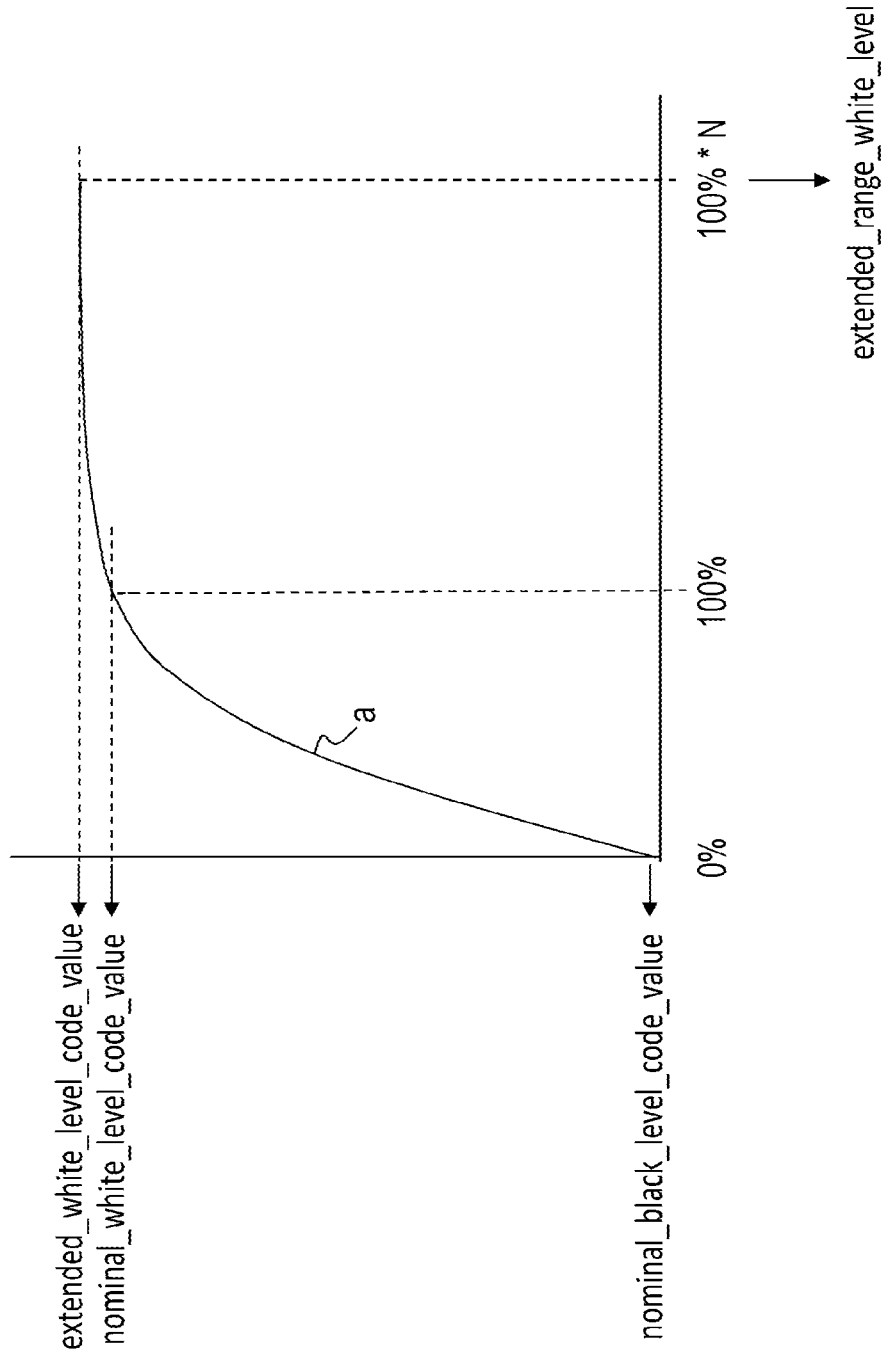
FIG. 5 is a view illustrating gamma curve information inserted to a layer of a video stream.

Returning to FIG. 1, the transmitting device 100 inserts information about the foregoing gamma curve into a layer of a video stream. This information contains "extended_range_white_level",
"nominal_black_level_code_value",
"nominal_white_level_code_value", and
"extended_white_level_code_value", for example, as illustrated in FIG. 5.

In this information, "extended_range_white_level" indicates a percentage of an integer multiple (N times) (100%*N) when "nominal while level (nominal white level) is set to 100%. In this information, "nominal_black_level_code_value" indicates a luminance sample value for a nominal black level. When video data is encoded on the basis of 8 bits, a black level is set to "16". In this information, "nominal_white_level_code_value" indicates a luminance sample value for a nominal white level. When video data is encoded on the basis of 8 bits, a white level is set to "235", for example. In this information, "extended_white_level_code_value" indicates a luminance sample value of "extended_range_white_level".

Moreover, the transmitting device 100 inserts auxiliary information into the layer of the video stream, which information is used for converting a high-level side level range of transmission video data on the 20 receiving side. This auxiliary information contains filter information and conversion curve information, for example. The auxiliary information will be detailed later.

Furthermore, the transmitting device 100 inserts, into a layer of a transport stream TS, identification information indicating that the gamma curve information and the auxiliary information have been inserted into the layer of the video stream. For example, the identification information is inserted as a subordinate of a program map table (PMT: Program Map Table) contained in the transport stream TS. The presence or absence of the gamma curve information and the auxiliary information is recognizable based on the identification information without the necessity of decoding the video stream. The identification information will be detailed later.

The receiving device 200 receives the transport stream TS transmitted while carried on broadcasting waves from the transmitting device 100. The transport stream TS includes a video stream containing encoded video data. The receiving device 200 acquires video data for display by decoding the video stream, for example.

As described above, the layer of the video stream contains insertion of the gamma curve information and the auxiliary information. On the other hand, the layer of the transport stream TS contains insertion of the identification information indicating whether or not the gamma curve information and the auxiliary information have been inserted. The receiving device 200 recognizes the presence of insertion of the gamma curve information and the auxiliary information into the layer of the video stream based on the identification information, and acquires these pieces of information from the video stream for utilization of these pieces of information for processing.

The receiving device 200 converts the high-level side level range of the video data after decoding (transmission video data) in such a manner that the maximum level becomes a predetermined level based on the auxiliary information. In this case, the receiving device 200 determines the predetermined level based on information about N contained in the auxiliary information, and information about a luminance dynamic range of a monitor, for example.

When the transmission video data is the transmission video data (a), transmission video data (b), or transmission video data (c) discussed above, the 10 receiving device 200 executes the following conversion processes. These conversion processes allow display with an appropriate luminance dynamic range on the receiving side.

"Conversion Process for Transmission Video Data (a)"

Figure 6:
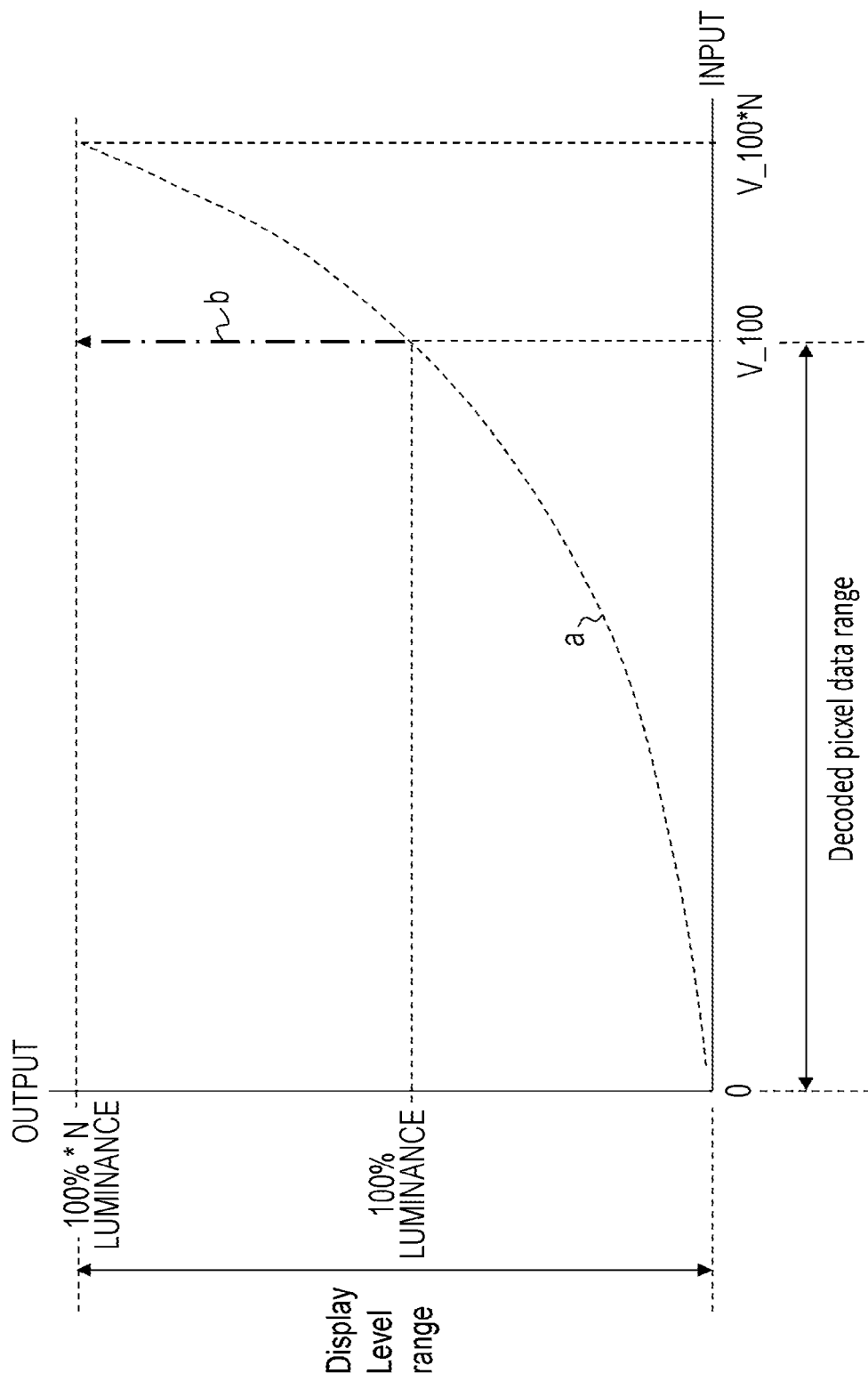
FIG. 6 is a view illustrating a conversion process executed on the receiving side for the transmission video data (a).

The conversion process for the transmission video data (a) is herein described with reference to FIG. 6. In this figure, "Decoded pixel data range" indicates a level range of input video data (transmission video data) from 0 to V_100. In this figure, "Display Level range" indicates a level range of a monitor (display) from 0% luminance to 100%*N luminance. A solid line a is a curve showing gamma characteristics of the monitor, as characteristics opposite to the characteristics of the foregoing gamma curve (see solid line a in FIG. 2).

The receiving device 200 converts levels of respective pixel data of transmission video data at the level of V 100 into levels within a range from V 100 to a predetermined level (V_100*N or lower) by applying a filter specified in filter information contained in the auxiliary information. In this case, the levels of the pixel data at the level of V_100 in the transmission video data prior to conversion are converted into such levels as to generate 100% luminance or higher in the monitor (display) as indicated by a chain line b. This video data after the conversion has the maximum level equivalent to the predetermined level higher than V_100, and constitutes video data with a high dynamic range.

"Conversion Process for Transmission Video Data (b)"

Figure 7:
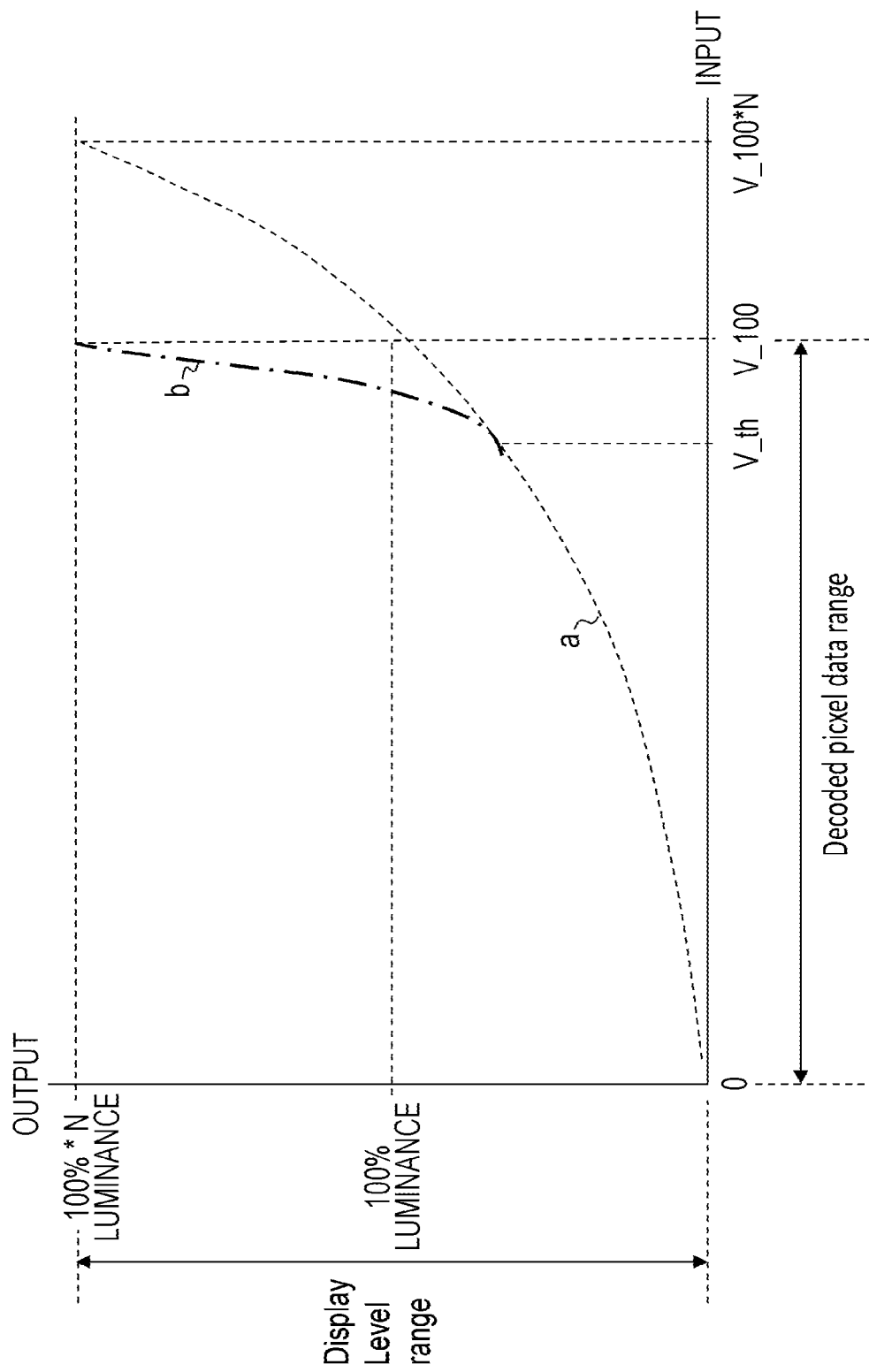
FIG. 7 is a view illustrating a conversion process executed on the receiving side for the transmission video data (b).

The conversion process for the transmission video data (b) is herein described with reference to FIG. 7. In this figure, "Decoded pixel data range" indicates a level range of input video data (transmission video data) from 0 to V_100. In this figure, "Display Level range" indicates a level range of a monitor (display) from 0% luminance to 100%*N luminance. A solid line a is a curve showing gamma characteristics of the monitor, as characteristics opposite to the characteristics of the foregoing gamma curve (see solid line a in FIG. 3)

The receiving device 200 converts levels of respective pixel data of transmission video data in the range from V_th to V_100 into levels within a range from V_th to the predetermined level (V_100*N or lower) by applying a filter specified in the filter information or the conversion curve information contained in the auxiliary information. In this case, the levels of the pixel data at the levels ranging from V_th to V_100 in the transmission video data prior to conversion are converted into such levels as to generate 100% luminance or higher in the monitor (display) as indicated by a chain line b. This video data after the conversion has the maximum level equivalent to the predetermined level higher than V_100, and constitutes video data with a high dynamic range.

Figure 8:
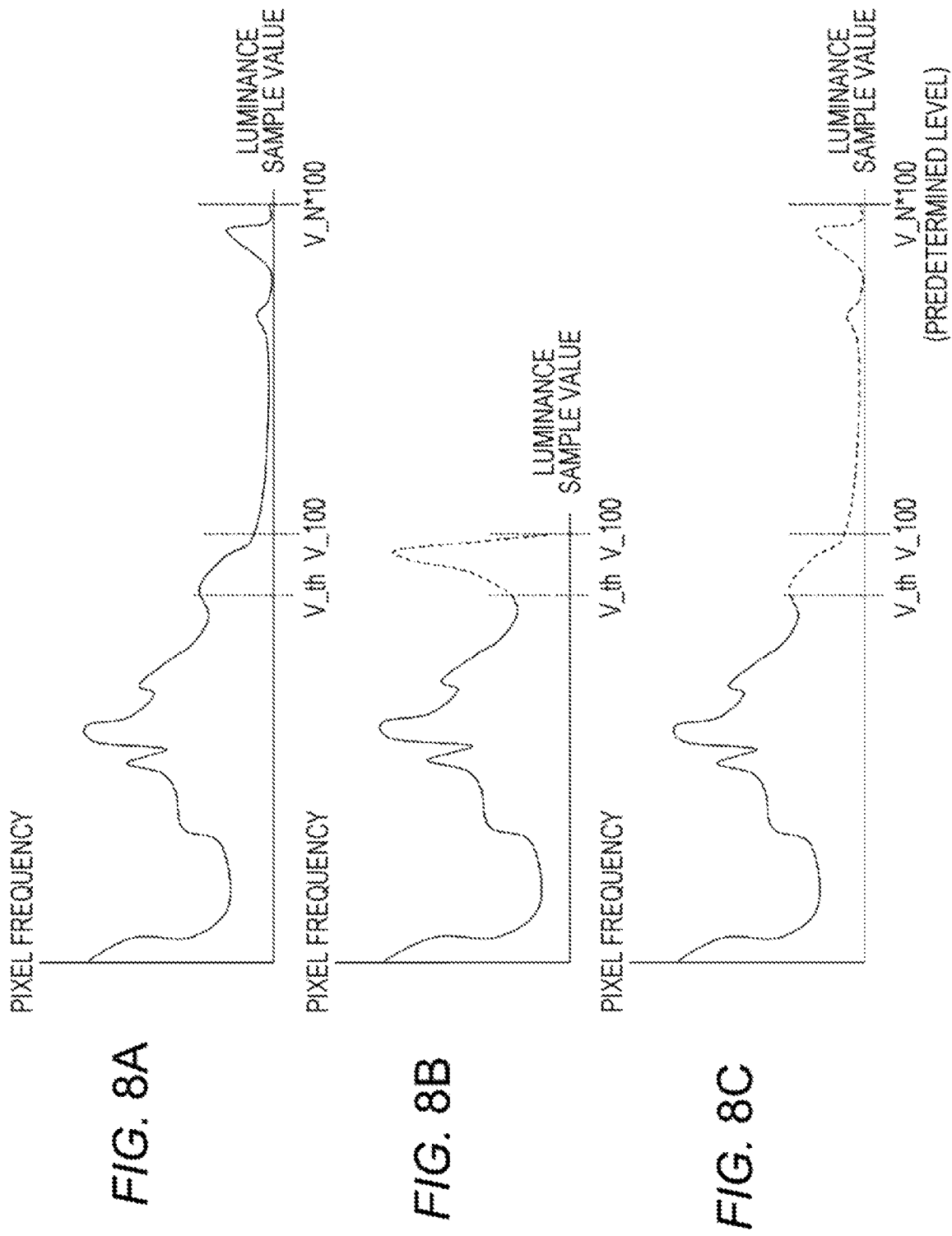
FIGS. 8A through 8C illustrate examples of a relationship between luminance sample values and pixel frequencies (frequencies).

FIGS. 8A through 8C illustrate examples of a relationship between luminance sample values and pixel frequencies (frequencies). FIG. 8A illustrates a state of input video data in the transmitting device 100, where the maximum sample value is V_N*100. FIG. 8B illustrates a state of transmission video data (output video data) after application of a gamma curve in the transmitting device 100, where the maximum sample value is limited to V_100. In this case, pixels of sample values within a range indicated by a broken line are affected by a mapping process, and therefore deviated from the original levels.

FIG. 8C illustrates a state after the conversion process in the receiving device 200. In this case, pixels existing in sample values within a range indicated by a broken line are pixels subjected to the conversion process (re-mapping process). This re-mapping process allows the levels of the respective pixels affected by the mapping process to approach the levels prior to the mapping process. According to FIG. 8C, the maximum of the sample values is V_N*100. However, the maximum of the sample values becomes a level lower than V_N*100 depending on the luminance dynamic range of the monitor (Monitor Luminance dynamic range).

"Conversion Process for Transmission Video Data (c)"

Figure 9:
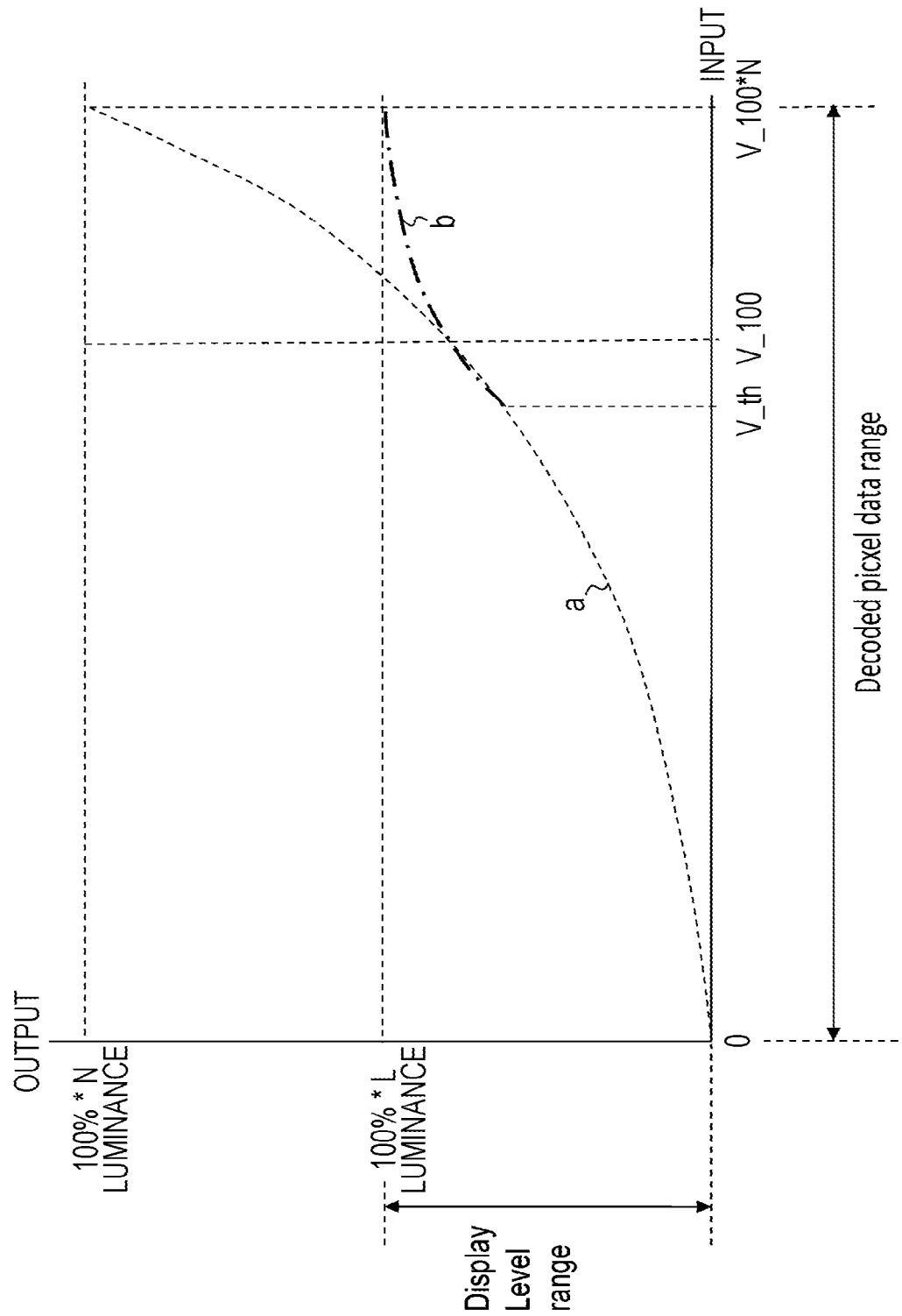
FIG. 9 is a view illustrating a conversion process executed on the receiving side for the transmission video data (c).

The conversion process for the transmission video data (b) is herein described with reference to FIG. 9. In this figure, "Decoded pixel data range" indicates a level range of input video da-a (transmission video data) from 0 to V_100*N. In this figure, "Display Level range" indicates a level range of a monitor (display) from 0% luminance to 100%*L luminance. A solid line a is a curve showing gamma characteristics of the monitor, as characteristics opposite to the characteristics of the foregoing gamma curve (see solid line a in FIG. 4).

The receiving device 200 converts levels of respective pixel data of transmission video data at the levels ranging from V_th to V_100*N into levels within a range from V_th to a predetermined level (V_100*L) by applying conversion curve information contained in the auxiliary information. In this case, the levels of the pixel data ranging from V_th to V_100*N in the transmission video data prior to conversion are converted into such levels as to generate V_100*L luminance or lower in the monitor (display) as indicated by a chain line b. This video data after the conversion has the maximum level equivalent to a predetermined level lower than V_100*N, and constitutes video data with a low dynamic range.

"Configuration Example of Transmitting Device"

Figure 10:
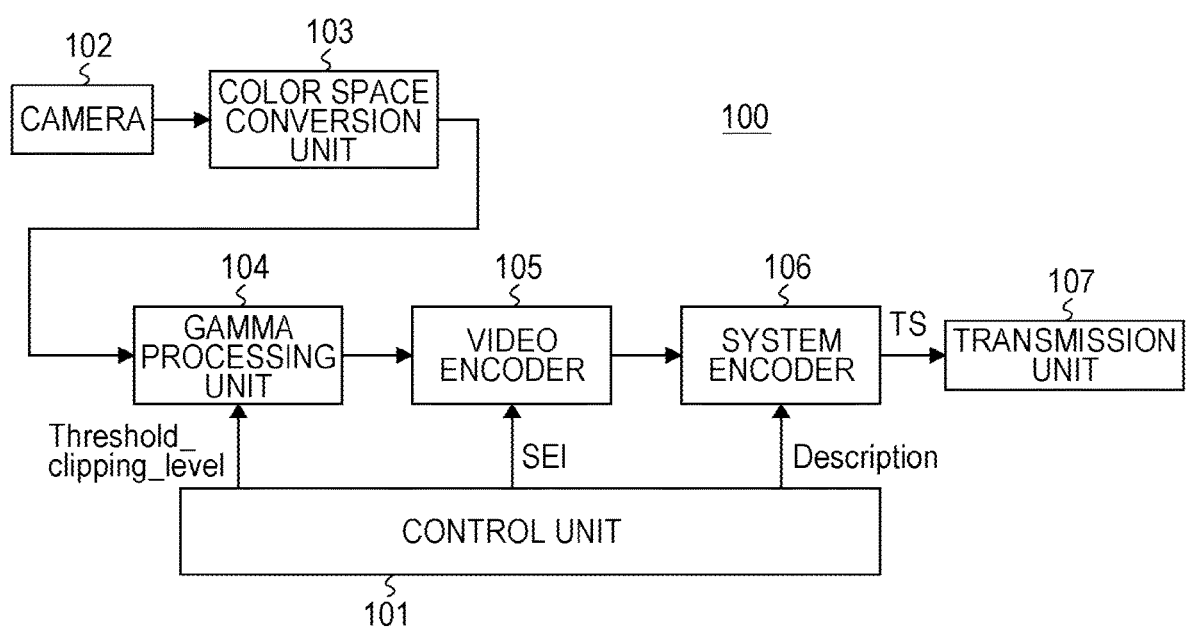
FIG. 10 is a block diagram illustrating a configuration example of a transmitting device 100.

FIG. 10 illustrates a configuration example of the transmitting device 100. The transmitting device 100 includes a control unit 101, a camera 102, a color space conversion unit 103, a gamma processing unit 104, a video encoder 105, a system encoder 106, and a transmission unit 107. The control unit 101 includes a CPU (Central Processing Unit), and controls operations of respective units of the transmitting device 100 based on a control program stored in a predetermined storage.

The camera 102 images a subject, and outputs video data with HDR (High Dynamic Range). This video data has levels in a range from 0 to 100%*N, such as 0 to 400% or 0 to 800%. In this case, a 100% level corresponds to a white luminance value of 100 cd/m2. The color space conversion unit 103 converts the RGB color space of video data output from the camera 102 into the YUV color space.

Figure 2:
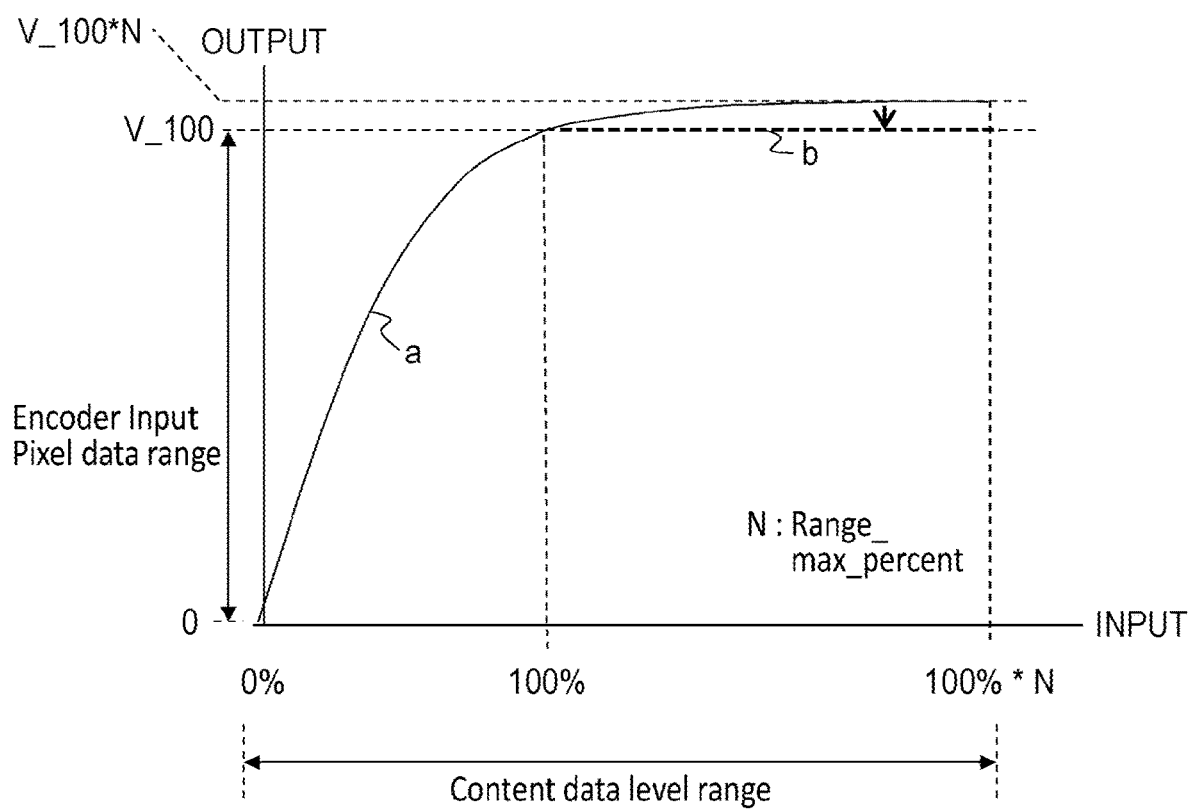
FIG. 2 is a view illustrating transmission video 25 data (a) obtained by applying a gamma curve.
Figure 3:
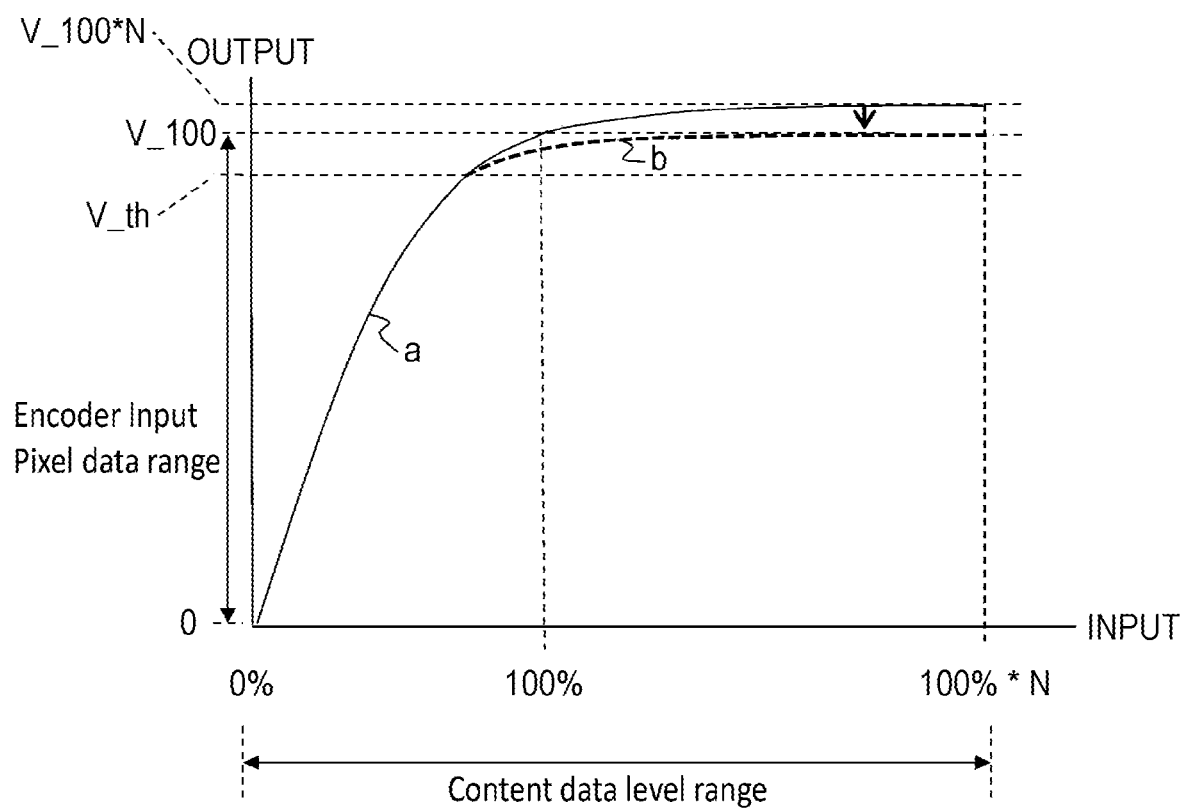
FIG. 3 is a view illustrating transmission video data (b) obtained by applying a gamma curve.
Figure 4:
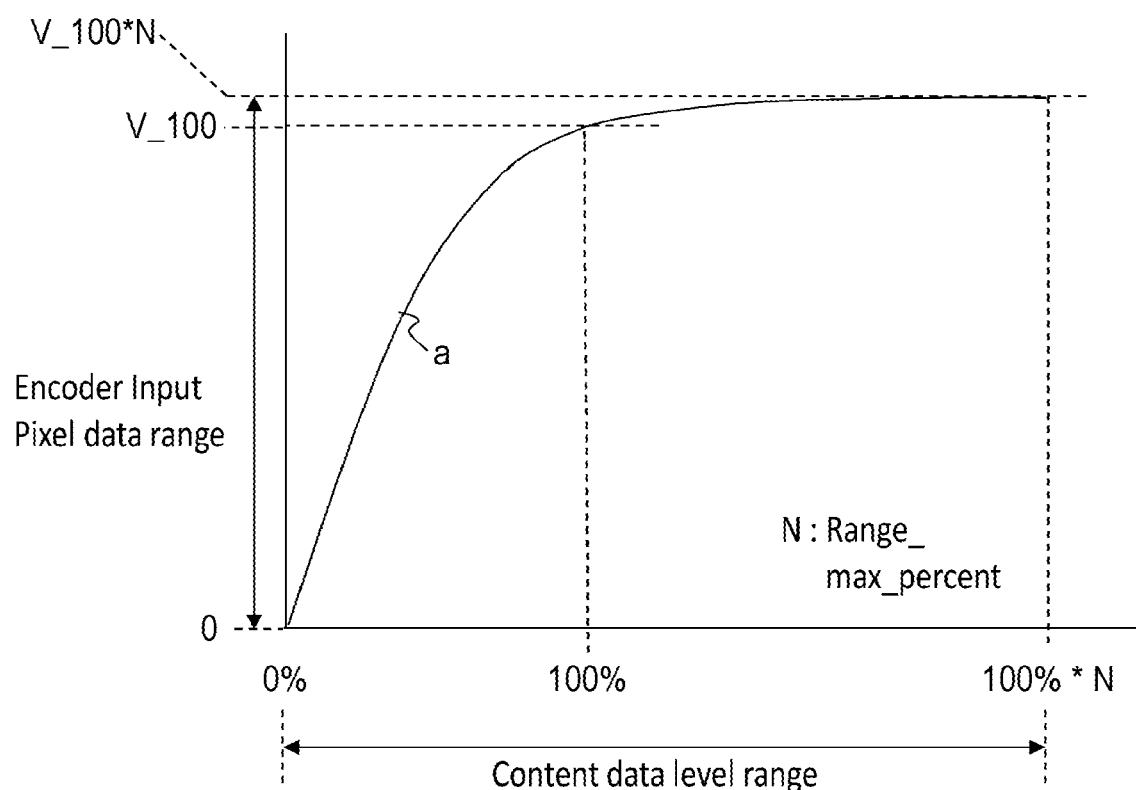
FIG. 4 is a view illustrating transmission video data (c) obtained by applying a gamma curve.

The gamma processing unit 104 applies a gamma curve to video data after color space conversion, and performs processing for converting high-luminance levels (mapping process and clipping process) as necessary, to obtain transmission video data (see FIGS. 2 through 4). This transmission video data is expressed on the basis of 8 bits in case of the transmission video data (a) and (b), and 9 or larger bits in case of the transmission video data (c).

The video encoder 105 encodes conversion video data using MPEG4-AVC, MPEG2video, or HEVC (high Efficiency Video Coding), for example, to obtain encoded video data. Moreover, the video encoder 105 generates a video stream (video elementary stream) containing this encoded video data by using a stream formatter (not shown) provided in a subsequent stage.

At this time, the video encoder 105 inserts gamma curve information and auxiliary information into a layer of the video stream. This auxiliary information is information used for converting high-luminance levels on the receiving side, and contains filter information, conversion curve information and others.

The system encoder 106 generates a transport stream TS containing the video stream generated by the video encoder 105. The transmission unit 107 transmits this transport stream TS carried on broadcasting waves or packets on a network to the receiving device 200.

At this time, the system encoder 106 inserts, into a layer of the transport stream TS, identification information indicating whether or not the gamma curve information and the auxiliary information have been inserted into the layer of the video stream. The system encoder 106 further inserts conversion curve data into the layer of the transport stream TS. The system encoder 106 inserts the identification information and the conversion curve data as a subordinate of a video elementary loop (Video ES loop) of a program map table (PMT: Program Map Table) contained in the transport stream TS, for example.

The operation of the transmitting device 100 illustrated in FIG. 10 is now briefly described. The RGB color space of HDR video data imaged by the camera 102 is converted into the YUV color space by the color space conversion unit 103. The HDR video data after the color space conversion is supplied to the gamma processing unit 104. The gamma processing unit 104 applies a gamma curve to the video data after the color space conversion, and performs processing for converting high-luminance levels (mapping process and clipping process) for the video data as necessary to obtain transmission video data. This transmission video data is supplied to the video encoder 105.

The video encoder 105 encodes the transmission video data by using MPEG4-AVC (MVC), MPEG2video, or HEVC (high Efficiency Video Coding), for example, to obtain encoded video data. The video encoder 105 generates a video stream (video elementary stream) containing this encoded video data. At this time, the video encoder 105 inserts gamma curve information into a layer of the video stream, and further inserts auxiliary information containing filter information, conversion curve information and the like, as auxiliary information used for converting the high-luminance levels on the receiving side, into the layer of the video stream.

The video stream generated by the video encoder 105 is supplied to the system encoder 106. The system encoder 106 generates an MPEG2 transport stream TS containing the video stream. At this time, the system encoder 106 inserts, into a layer of the transport stream TS, the conversion curve data, and identification information indicating that the gamma curve information and the auxiliary information have been inserted into the layer of the video stream. The transmission unit 107 transmits this transport stream TS carried on broadcasting waves.

[Gamma Curve Information, Auxiliary Information, Identification Information, Conversion Curve Data Structure, and TS Structure]

As described above, the gamma curve information and the auxiliary information are inserted into a layer of a video stream. When the encoding system is MPEG4-AVC, or other encoding systems such as HEVC, which have similar encoding structure such as the structure of NAL packets, for example, the auxiliary information is inserted into a part "SEIs" of an access unit (AU) as an SEI message.

The gamma curve information is inserted as a tone mapping information SEI message (Tone mapping information SEI message). The auxiliary information is inserted as an HDR conversion SEI message (HDR conversion SEI message).

Figure 11:
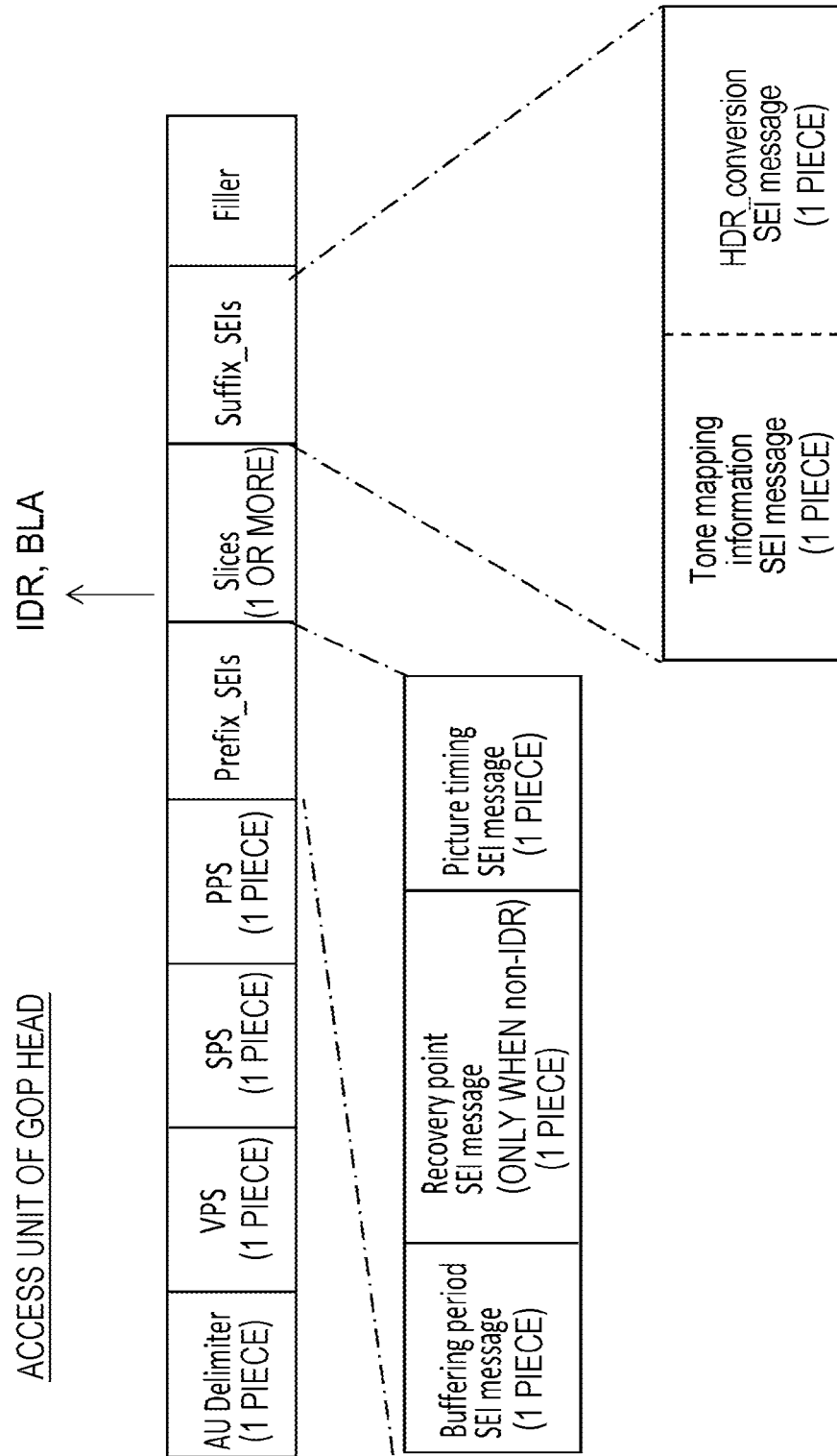
FIG. 11 is a view illustrating an access unit at a head of GOP when an encoding system is HEVC.
Figure 12:
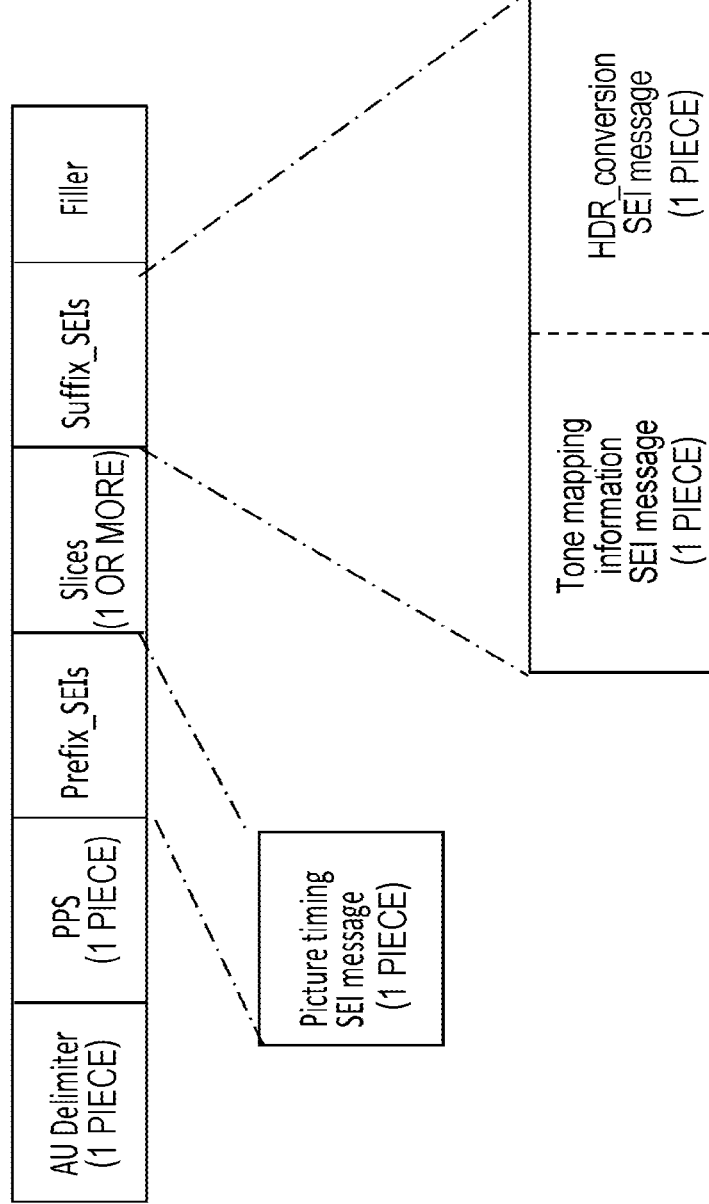
FIG. 12 is a view illustrating an access unit at a position other than the head of the GOP when the encoding system is HEVC.

FIG. 11 illustrates an access unit located at a head of GOP (Group Of Pictures) when the encoding system is HEVC. FIG. 12 illustrates an access unit located at a position of GOP (Group Of Pictures) other than the head thereof when the encoding system is HEVC. In case of the encoding system of HEVC, an SEI message group for decoding "Prefix_SEIs" are disposed before slices (slices) where pixel data are encoded, while an SEI message group for display "Suffix_SEIs" are disposed after these slices (slices).

As illustrated in FIGS. 11 and 12, the tone mapping information SEI message (Tone mapping information SEI message) and the HDR conversion SEI message (HDR conversion SEI message) are disposed as the SKI message group "Suffix_SEIs".

FIGS. 13 and 14 illustrate structure examples (Syntax) of the "Tone mapping information SEI message". FIG. 15 illustrates contents of chief information (Semantics) in the structure examples. In these figures, "Tone mapping_cancel_flag" is 1-bit flag information. In this case, "1" indicates cancellation of a previous message state of the tone mapping ((Tone mapping). In addition. "0" indicates transmission of respective elements for refreshment of a previous state.

An 8-bit field of "coded_data_bit_depth" indicates a bit length of encoded data, and uses 8 to 14 bits, for example. In these figures, "target_bit_depth" indicates the maximum bit length assumed as an output (output) bit length in a process performed based on the tone mapping information SEI message, and is allowed to use 16 bits as the maximum.

A 32-bit field of "ref_screen_luminance_white" indicates a nominal white level of a reference monitor, and is expressed by the unit of "cd/m2". In these figures, "extended_range_white_level" indicates a percentage of an integer multiple (N times) (100%*N) when "nominal while level (nominal_white_level)" is set to 100%. In these figures, "nominal_black_level_code_value" indicates a luminance sample value for a nominal black level. When video data is encoded on the basis of 8 bits, a black level is set to "16". In these figures, "nominal_white_level_code_value" indicates a luminance sample value for the nominal white level. When video data is encoded on the basis of 8 bits, the white level is set to "235". In this information, "extended_white_level_code_value" indicates a luminance 15 sample value of "extended_range_white_level".

FIG. 16 illustrates a structure example (Syntax) of the "HDR_conversion SEI message". FIG. 17 indicates contents of chief information (Semantics) in this structure example. In these figures, "HDR_conversion_cancel_flag" is 1-bit flag information. In this case, "1" indicates cancellation of a message state of a previous HDR conversion (HDR_conversion). In addition, "0" indicates transmission of respective elements for refreshment of a previous state.

A 16-bit field of "threshold_clipping_level" indicates a threshold of luminance converted into a conventional encoding range by non-linear tone mapping (tone mapping) within a range of HDR. In other words, "threshold_clipping_level" indicates V_th (see FIG. 3). An 8-bit field of "operator type" indicates a filter type used at the time of execution of marking (Marking) of luminance levels exceeding the V_th (threshold_clipping_level). An 8-bit-filed of "range_max_percent" indicates N of 100%*N.

An 8-bit field of "level mapping curve type" indicates a type of a function for converting luminance levels exceeding the V_th (threshold clipping level) into target luminance levels. This 8-bit field of "level_mapping_curve_type" is disposed only when "threshold_clipping_level" <"nominal_white_level_code_value" holds, i.e., when the V_th is lower than luminance 100%.

As described above, identification information indicating that gamma curve information and auxiliary information have been inserted into a layer of a video stream is inserted as a subordinate of a video elementary loop (Video ES loop) of a program map table (PMT) of a transport stream TS, for example.

FIG. 18 illustrates a structure example (Syntax) of an HDR simple descriptor (HDR_simple descriptor) as identification information. FIG. 19 illustrates contents of chief information (Semantics) in this structure example.

An 8-bit field of "HDR_simple descriptor tag" indicates a descriptor type, showing that this structure is an HDR simple descriptor. An 8-bit field of "HDR_simple descriptor length" indicates a length (size) of the descriptor, showing a byte count of the subsequent part as the length of the descriptor.

A 1-bit field of "Tonemapping_SEI_existed" is flag information indicating whether or not tone mapping SEI information (gamma curve information) is present in a video layer (layer of video stream). In this case, "1" indicates that the tone mapping SEI information is present, while indicates that the tone mapping SEI information is absent.

A 1-bit field of "HDR_conversion_SEI_existed" is flag information which indicates whether or not HDR conversion SEI information (auxiliary information) is present in the video layer (layer of video stream). In this case, "1" indicates that the HDR conversion SEI information is present, while "0" indicates that the HDR conversion SEI information is absent.

FIG. 20 illustrates a structure example (Syntax) of an HDR full descriptor (HDR_full descriptor) as identification information. An 8-bit field of "HDR_full descriptor tag" indicates a descriptor type, showing that this structure is an HDR full descriptor. An 8-bit field of "HDR_full descriptor length" indicates a length (size) of the descriptor, showing a byte count of the subsequent part as the length of the descriptor.

While not detailed herein, this HDR full descriptor further includes the foregoing tone mapping information SEI message (see FIGS. 13 and 14), and HDR conversion SEI message (see FIG. 16), as well as information contained in the HDR simple descriptor (see FIG. 18).

In this case, it is allowed on the receiving side to recognize not only the presence or absence of the tone mapping SEI information and the HDR conversion SEI information in the video layer, but also information contents contained therein, before decoding the video stream based on the HDR full descriptor.

As described above, the conversion curve data is further inserted as a subordinate of the video elementary loop (Video ES loop) of the program map table (PMT) of the transport stream TS, for example. FIG. 21 illustrates a structure example (Syntax) of a level mapping curve descriptor (level_mapping_curve descriptor) as conversion curve data.

An 8-bit field of "level mapping curve descriptor tag" indicates a descriptor type, showing that this structure is a level mapping curve descriptor. An 8-bit field of "level_mapping_curve descriptor length" indicates a length (size) of the descriptor, showing a byte count of the subsequent part as the length of the descriptor.

An 8-bit field of "mapping_curve_table_id" indicates an identifier (id) of a table of a mapping curve (mapping curve). This "mapping_curve_table_id" allows coexistence of a plurality of types of use cases (Usecase). For example, the "mapping_curve_table_id" allows discrimination between conversion curves (mapping curves) used for the conversion process for each of the transmission video data (b) and the transmission video data (c).

A 16-bit field of "number of levels N" indicates a number of levels contained in a conversion target level range of the transmission video data. In this case, the conversion target level range is from V_th to V_100 for the transmission video data (b) (see FIG. 7), and from V_th to V_100*N for the transmission video data (c) (see FIG. 9).

An 8-bit field of "number of curve types C" indicates a type of the conversion curve (mapping curve). This "number of curve types C" allows coexistence of a plurality of types of conversion curves having different conversion characteristics. Possible examples of conversion curves having different conversion characteristics include conversion curves having different maximum levels after conversion, and conversion curves having an identical maximum level but different intermediate conversion levels.

Figure 22:
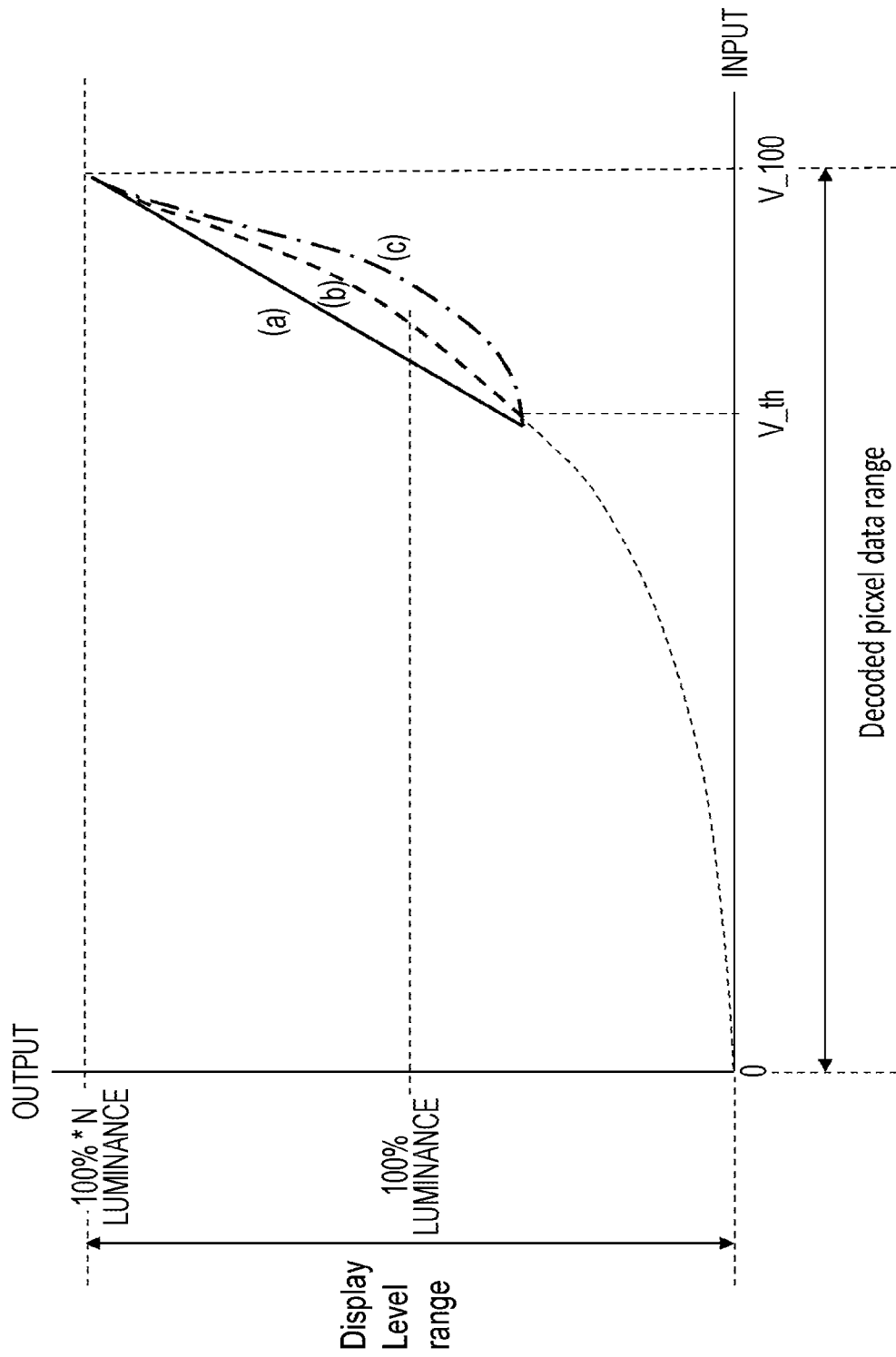
FIG. 22 is a view illustrating a conversion curve (mapping curve) for converting high-level side levels of transmission video data.

A 16-bit field of "curve_data" indicates values of the conversion curve (mapping curve) after conversion. FIG. 22 illustrates an example of three types of conversion curves (mapping curves) (a), (b), and (c). The respective examples have the maximum level of V_100*N after conversion, and have different intermediate conversion levels. FIG. 23 schematically illustrates a table of mapping curves (mapping curves) corresponding to the three types of conversion curves (mapping curves) (a), (b), and (c) illustrated in FIG. 22.

Figure 24:
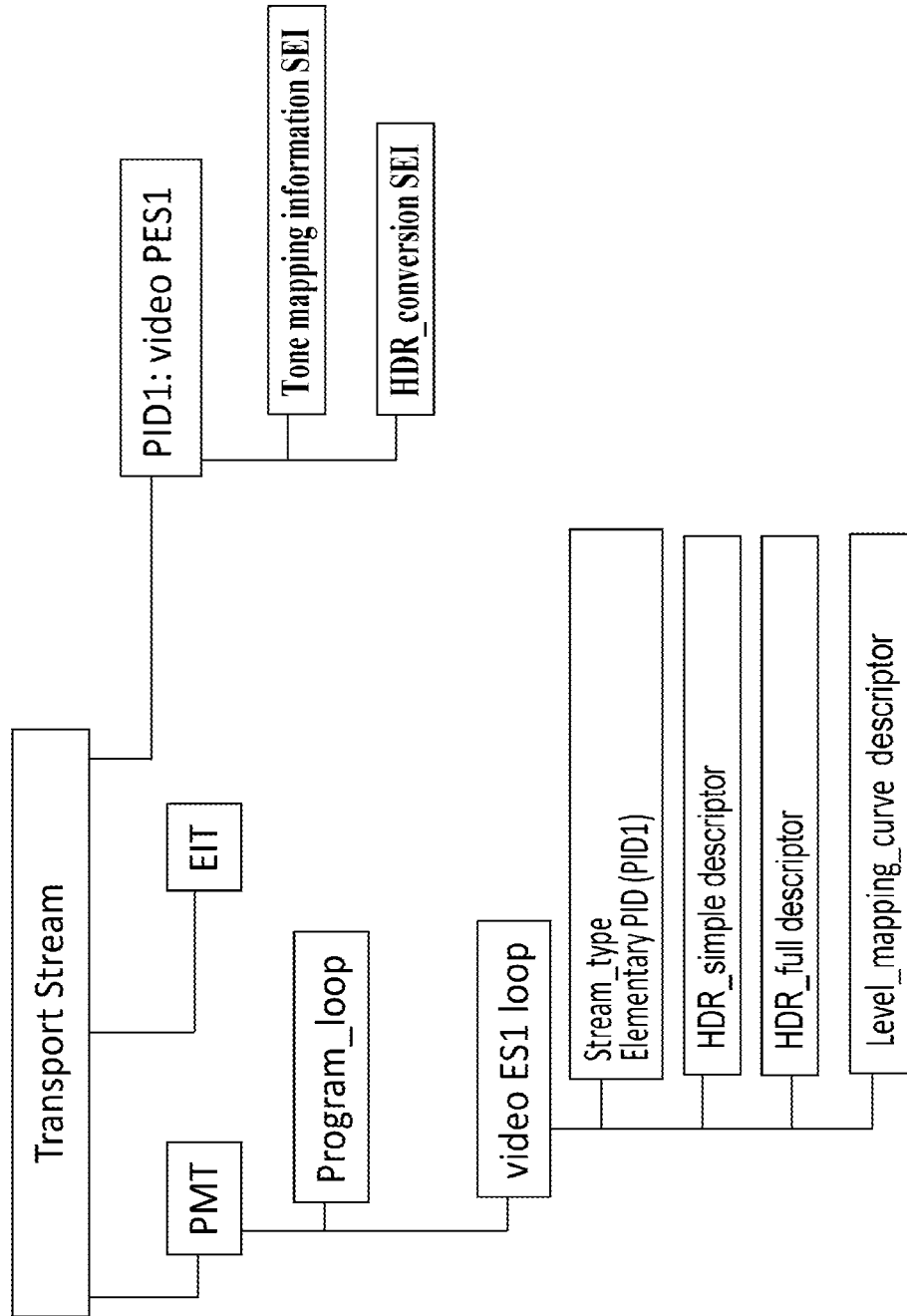
FIG. 24 is a view illustrating a configuration example of an MPEG2 transport stream containing various types of SEI messages and descriptors.

FIG. 24 illustrates a configuration example of a transport stream TS. The transport stream TS contains a PES packet "PID1: video PES1" of a video elementary stream. Tone mapping SEI information and HDR conversion SEI information are inserted into this video elementary stream.

The transport stream TS further contains a PMT (Program Map Table) as PSI (Program Specific Information). This PSI is information describing to which programs respective elementary streams contained in the transport stream belong. The transport stream TS further contains EIT (Event Information Table) as SI (Serviced Information) for management by the unit of an event (program).

The PMT includes an elementary loop containing information concerning respective elementary streams According to this configuration example, the PMT includes a video elementary loop (Video ES loop). This video elementary loop includes information such as a stream type, and a packet identifier (PID) associated with the one video elementary stream described above, and further a descriptor describing information concerning this video elementary stream.

The HDR simple descriptor (HDR_simple descriptor) or the HDR full descriptor (HDR_full descriptor) is disposed as a subordinate of the video elementary loop (Video ES loop) of the PMT. As discussed above, these descriptors indicate that the tone mapping SEI information and the HDR conversion SEI information have been inserted into the video stream. Moreover, a level mapping curve descriptor (level_mapping_curve descriptor) is disposed as a subordinate of the video elementary loop (Video ES loop) of the PMT.

"Configuration Example of Receiving Device"

Figure 25:
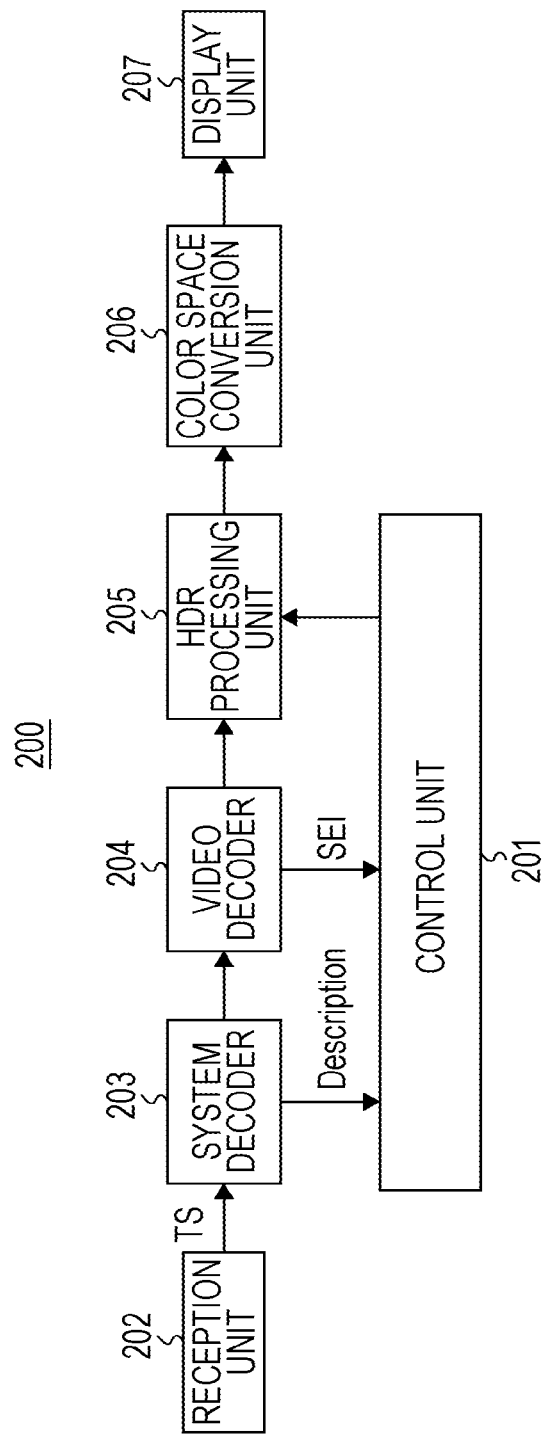
FIG. 25 is a block diagram illustrating a configuration example of a receiving device.

FIG. 25 is a configuration example of the receiving device 200. The receiving device 200 includes a control unit 201, a reception unit 202, a system decoder 203, a video decoder 204, an HDR processing unit 205, a color space conversion unit 206, and a display unit 207. The control unit 201 includes a CPU (Central Processing Unit), and controls operations of respective units of the receiving device 200 under a control program stored in a predetermined storage.

The reception unit 202 receives a transport stream TS transmitted from the transmitting device 100 while carried on broadcasting waves. The system decoder 203 extracts a video stream (elementary stream) from this transport stream TS. The system decoder 203 further extracts the foregoing HDR simple descriptor (HDR_simple descriptor) or HDR full descriptor (HDR_full descriptor) from this transport stream TS, and transmits the extracted descriptor to the control unit 201.

The control unit 201 is capable of recognizing whether or not tone mapping SEI information and HDR conversion SRI information have been inserted into the 5 video stream based on the descriptor. When recognizing that the SEI information is present, the control unit 203 is enabled to control the video decoder 204 such that the video decoder 204 positively acquires the SRI information, for example.

The system decoder 203 extracts a level mapping curve descriptor (level_mapping_curve descriptor) from this transport stream TS, and transmits the extracted descriptor to the control unit 201. The control unit 201 is capable of controlling, based on a table of a mapping curve (mapping curve) contained in this descriptor, a conversion process executed by the HDR processing unit 205 using conversion curve information.

The video decoder 204 acquires baseband video data (transmission video data) by executing a decoding process for the video stream extracted by the system decoder 203. The video decoder 204 further extracts an SEI message inserted into the video stream, and transmits the extracted SEI message to the control unit 201. This SEI message contains a tone mapping information SEI message (Tone mapping information SEI message) and an HDR conversion SEI message (HDR conversion SEI message). The control unit 201 controls the decoding process and a display process based on the SEI information.

The HDR processing unit 205 converts a high-level side level range of the video data obtained by the video decoder 204 (transmission video data) based on auxiliary information such that the maximum level of the video data becomes a predetermined level. In this case, the HDR processing unit 205 executes processing corresponding to the transmission video data (a), (b), and (c), as discussed above (see FIGS. 6, 7, and 9).

The HDR processing unit 205 will be detailed later.

The color space conversion unit 206 converts the YUV color space of the video data obtained by the HDR processing unit 205 into the RGB color space. The display unit 207 displays an image based on video data after the color space conversion.

[Configuration Example of HDR Processing Unit]

Figure 26:
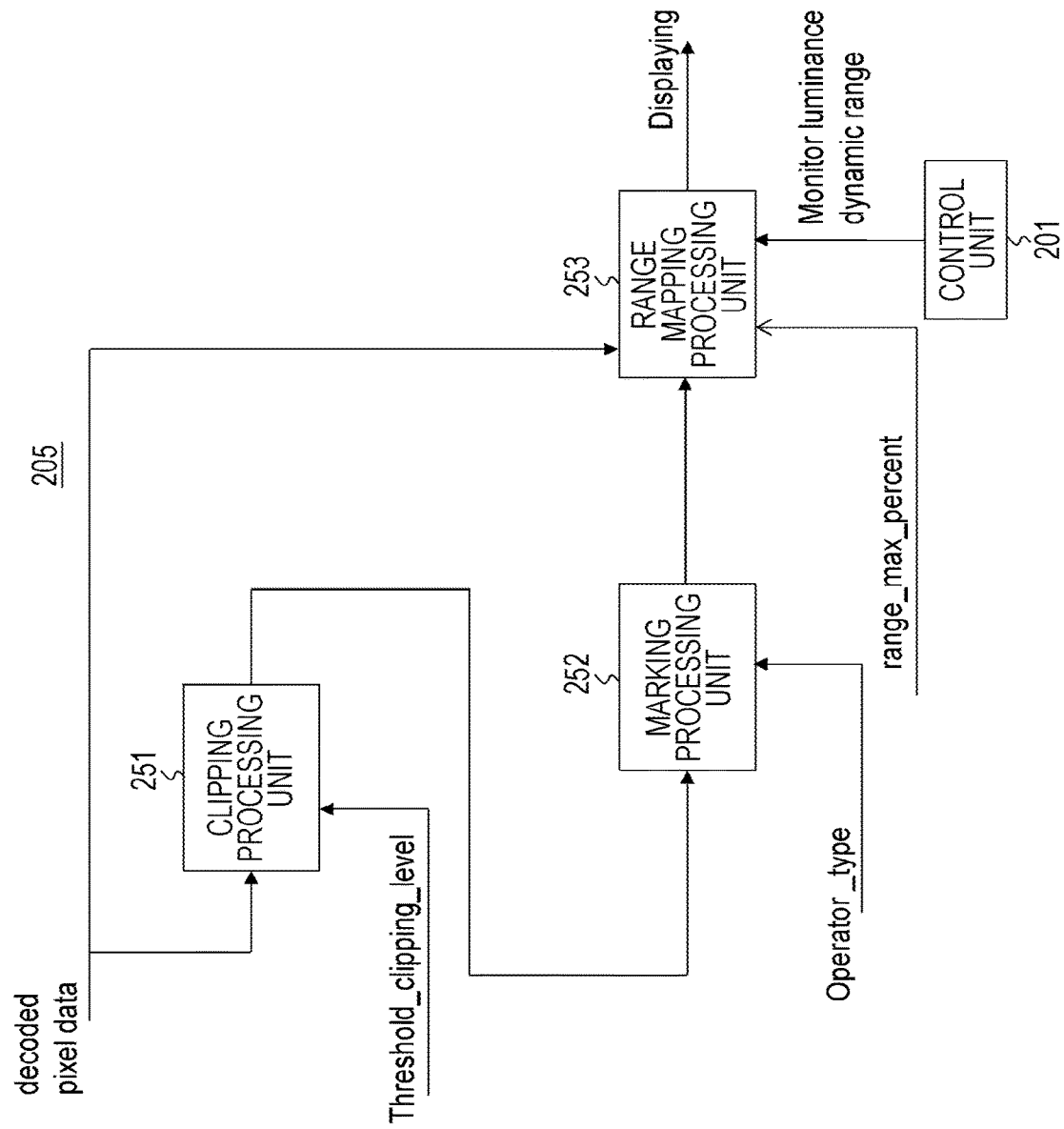
FIG. 26 is a block diagram illustrating a configuration example of an HDR processing unit of the receiving device.

FIG. 26 illustrates a configuration example of the HDR processing unit 205. The HDR processing unit 205 includes a clipping processing unit 251, a marking processing unit 252, and a range mapping processing unit 253. In case of the transmission video data (a) (see FIG. 6), the transmission video data (decoded pixel data) is input to the clipping processing unit 251, where a process using filter information is executed.

In case of the transmission video data (b) (see FIG. 7), the transmission video data (decoded pixel data) is input to the clipping processing unit 251 when V_th (threshold_clipping_level)=V_100. In the clipping processing unit 251, a process using filter information is executed.

Concerning this transmission video data (b) (see FIG. 7), either the process using filter information or a 5 process using conversion curve information is executable when V_th (threshold_clipping_level)<V_100. When the process using the filter information is executed, the transmission video data (decoded pixel data) is input to the clipping processing unit 251. When the process using the conversion curve information is executed, the transmission video data (decoded pixel data) is input to the range mapping processing unit 253.

In case of the transmission video data (c) (see FIG. 9), the transmission video data (decoded pixel data) is input to the range mapping processing unit 253, where a process using conversion curve information is executed.

Initially discussed is the case of execution of the process using the filter information. The clipping processing unit 251 extracts, as a target for a re-mapping process, pixel data at levels equal to or higher than a level of a threshold clipping level (Threshold clipping level) from pixel data constituting the transmission video data, using this threshold clipping level. In case of the transmission video data (a), the threshold clipping level (Threshold_clipping_level) Becomes V_100.

Figure 27A:
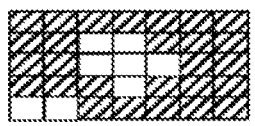
FIGS. 27A through 27D are views illustrating processes of respective units of the HDR processing unit 25 when filter information is used.
Figure 27B:
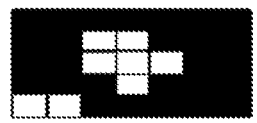

For example, it is assumed that FIG. 27A shows a part of pixel data constituting transmission video data, where only pixel data indicated in white corresponds to pixel data at levels equal to or higher than the threshold clipping level. As illustrated in FIG. 27B, the clipping processing unit 251 extracts pixel data indicated as a white part and corresponding to a target of the re-mapping process. In this case, the HDR processing unit 205 outputs pixel data not corresponding to the target of the re-mapping process without changing values of these data.

Figure 27C:
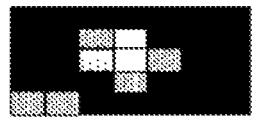
Figure 27D:
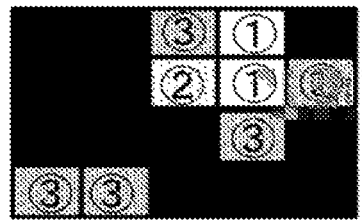

The marking processing unit 252 performs level separation for each pixel data corresponding to the target of the re-mapping process by executing filter type filtering operation indicated by an operator type (Operator type), while using pixel data around the corresponding pixel data as well. FIG. 27C illustrates a state of level separation of the respective pixel data corresponding to the target of the re-mapping process. FIG. 27D illustrates three stages of level separation, i.e., (1) "highest level", (2) "2nd highest level", and (3) "3rd highest level". While the stages of level separation are constituted by three stages herein for easy understanding, a larger number of stages are established in an actual situation.

The range mapping processing unit 253 maps the values of the respective pixel data into values corresponding to the respective stages of level separation, and outputs the results. The range mapping processing unit 253 maps the values by using a range max percent (renge_max_percent), i.e., the value N and a monitor luminance dynamic range (Monitor Luminance dynamic range).

Figure 28:
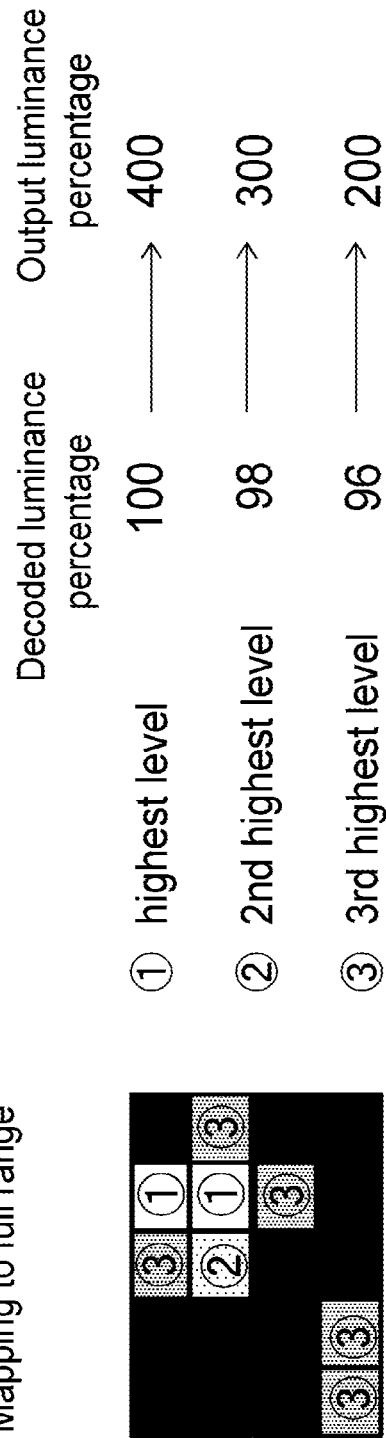
FIG. 28 is a view illustrating a process of a range mapping processing unit when the filter information is used.

FIG. 28 illustrates an example of range mapping. According to this example shown in the figure, the range max percent (renge_max_percent) is "4", while the monitor luminance dynamic range (Monitor Luminance dynamic range) is 400%. (1) The pixel data of "highest level" is mapped to such a value that the output luminance percentage (Output luminance percentage) corresponding to output luminance of the display unit 207 becomes 400%. (2) The pixel data of "2nd highest level" is mapped to such a value that the output luminance percentage becomes 300% (3) The pixel data of "3rd highest level" is mapped to such a value that the output luminance percentage becomes 200%.

FIG. 29 illustrates another example of range mapping. It is assumed that the marking processing unit 20 252 separates respective examples from "Case 1" to "Case 4" into two stages of (1) "highest level" and (2) "2nd highest level" for easy understanding of the explanation.

According to the example "Case 1" shown in the figure, the range max percent is "8", while the monitor luminance dynamic range is "800%". The pixel data of (1) "highest level" is mapped to such a value that the output luminance percentage becomes 800%. The pixel data of (2) "2nd highest level" is mapped to such a value that the output luminance percentage becomes 400%.

According to the example "Case 2" shown in the figure, the range max percent is "4", while the monitor luminance dynamic range is 800%. The pixel data of (1) "highest level" is mapped to such a value that the output luminance percentage becomes 400%. The pixel data of (2) "2nd highest level" is mapped to such a value that the output luminance percentage becomes 200%.

In case of this example, the dynamic range of the 10 video data extends up to 400%. Accordingly, the maximum of the output luminance percentage is so selected as to correspond to 400% of the dynamic range of the video data even when the dynamic range of the monitor luminance extends up to 800%. As a result, unnecessary brightness 15 and unnaturalness of the high-luminance part is reducible.

According to the example "Case 3" shown in the figure, the range max percent is "8", while the monitor luminance dynamic range is 400%. The pixel data of (1) "highest level" is mapped to such a value that the output luminance percentage becomes 400%. The pixel data of (2) "2nd highest level" is mapped to such a value that the output luminance percentage becomes 200%.

In case of this example, the dynamic range of the monitor luminance extends up to 400%. Accordingly, the maximum of the output luminance percentage is so selected as to correspond to 400% of the dynamic range of the video data even when the dynamic range of the monitor luminance extends up to 400%. As a result, video data for display coinciding with the dynamic range of the monitor luminance is obtainable, wherefore a blown-out state on the high-luminance side, i.e., so-called blown-out highlights state is avoidable.

According to the example "Case 4", the range max percent is "8", while the monitor luminance dynamic range is 100%. The pixel data of (1) "highest level" is mapped to such a value that the output luminance percentage becomes 100%. The pixel data of (2) "2nd highest level" is mapped to such a value that the output luminance percentage becomes lower than 100%.

Discussed next is the case of execution of the process using conversion curve information. The range mapping processing unit 253 maps values of respective pixel data in a conversion target level range from V_th to V_100*N contained in transmission video data with reference to a table of a mapping curve (mapping curve), and outputs the mapped values as output data. The conversion curve used in this case is a conversion curve having a range max percent (renge_max_percent), i.e., the maximum level after conversion determined by using the value N and the monitor luminance dynamic range (Monitor Luminance dynamic range).

The maximum level after conversion is determined in a manner similar to the manner when the filter information is used as discussed above (see FIG. 29). In case of the range max percent set to "8", and the monitor luminance dynamic range set to "800%", for example, the maximum level to be determined is such a value that the output luminance percentage becomes 800%. In case of the range max percent set to "4", and the monitor luminance dynamic range set to "800%", for example, the maximum level to be determined is such a value that the output luminance percentage becomes 400%.

As for pixel data out of the conversion target level range in the transmission video data, values of the respective pixel data out of the conversion target level range are used as output from the range mapping processing unit 253 without a change, and therefore used as output from the HDR processing unit 205.

FIG. 30 illustrates an example (Case 5) of range mapping. According to this example shown in the figure, the range max percent (renge_max_percent) is "4", while the monitor luminance dynamic range (Monitor Luminance dynamic range) is 200%. In this case, the maximum level to be determined is such a value that the output luminance percentage becomes 200%. According to this example, the maximum level of the transmission video data "960" is converted to a level "480".

The range mapping processing unit 253 uses information on the monitor luminance dynamic range (Monitor Luminance dynamic range). When the receiving device 200 is a set top box (STB), this monitor luminance dynamic range is allowed to be determined based on information obtained from EDID on the monitor side via HDMI. The "Range_max_percent", and respective elements of the SEI message and the descriptor are allowed to be shared between the set top box and the monitor when these elements are defined in Vender Specific Info Frame. In this context, HDMI is a registered trademark.

The operation of the receiving device 200 illustrated in FIG. 25 is now briefly described. The reception unit 202 receives a transport stream TS transmitted from the transmitting device 100 while carried on broadcasting waves. This transport stream TS is supplied to the system decoder 203. The system decoder 203 extracts a video stream (elementary stream) from this transport stream TS. The system decoder 203 further extracts an HDR simple descriptor (HDR simple descriptor) or an HDR full descriptor (HDR full descriptor) from this transport stream TS, and transmits the extracted descriptor to the control unit 201.

The control unit 201 recognizes whether or not tone mapping SEI information and HDR conversion SEI information have been inserted into the video stream based on this descriptor. When recognizing that the SEI information is present, the control unit 203 is enabled to control the video decoder 204 such that the video decoder 204 positively acquires the SEI information, for example.

The video stream extracted by the system decoder 204 is supplied to the video decoder 204. The video decoder 204 performs a decoding process for the video stream to generate baseband video data. The video decoder 204 further extracts the SEI message inserted into this video stream, and transmits the extracted SEI message to the control unit 201.

This SEI message contains a tone mapping information SEI message (Tone mapping information SEI message) and an HDR conversion SEI message (HDR conversion SEI message). The control unit 201 controls the decoding process and a display process based on the SEI information.

The video data obtained by the video decoder 204 (transmission video data) is supplied to the HDR processing unit 205. The HDR processing unit 205 converts the high-level side level range of the transmission video data such that the maximum level of the transmission video data becomes a predetermined level based on auxiliary information.

The YUV color space of the video data obtained by the HDR processing unit 206 is converted into the RGB color space by the color space conversion unit 206. The video data after the color space conversion is supplied to the display unit 207. The display unit 207 displays an image corresponding to reception video data with a luminance dynamic range of the transmitted video data, and further with a luminance dynamic range in accordance with the luminance dynamic range of the monitor.

As described above, the transmitting device 100 in the transmitting and receiving system 10 illustrated in FIG. 1 transmits transmission video data obtained by applying a gamma curve to input video data having a level range from 0% to 100%*N, together with transmission of auxiliary information used for converting high-luminance levels on the receiving side. Accordingly, the receiving side is capable of converting high-luminance levels of the transmission video data based on this auxiliary information, for example, wherefore the receiving side is capable of realizing display with an appropriate luminance dynamic range.

Moreover, the transmitting and receiving system 10 illustrated in FIG. 1 inserts, into a layer of a transport stream TS transmitted from the transmitting device 100 to the receiving device 200, identification information indicating that auxiliary information has been inserted into a layer of a video stream. Accordingly, insertion of the auxiliary information into the video stream is recognizable without the necessity of decoding the video stream, wherefore appropriate extraction of the auxiliary information from the video stream is realizable.

2. Modified Example

[Application to MPEG-DASH Base Stream Distribution System]

Discussed in the foregoing embodiment has been a container constituted by a transport stream (MPEG-2 TS). However, the present technology is similarly applicable to a system configured to realize distribution to a receiving terminal by using a network such as the Internet. In case of distribution via the Internet, MP4 or other format containers are often used for distribution.

Figure 31:
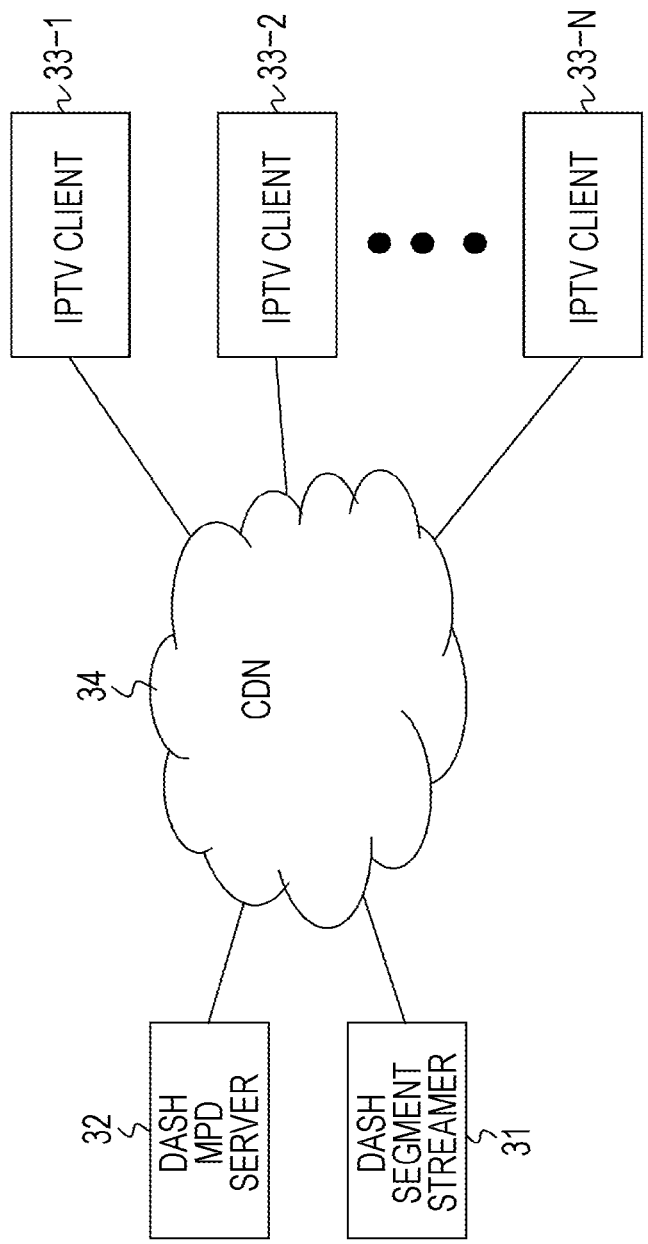
FIG. 31 is a block diagram illustrating a configuration example of an MPEG-DASH base stream distribution system.

FIG. 31 illustrates a configuration example of a stream distribution system 30. This stream distribution system 30 is a MPEG-DASH base stream distribution system. According to the configuration of the stream distribution system 30, N pieces of IPTV clients 33-1, 33-2, and up to 33-N are connected with a DASH segment streamer 31 and a DASH MPD server 32 via CDN (Content Delivery Network) 34.

The DASH segment streamer 31 generates DASH specification stream segments (hereinafter referred to as "DASH segments") based on media data of predetermined content (such as video data, audio data, and subtitle data), and transmits the segments in response to an HTTP request from an IPTV client. The DASH segment streamer 31 may be a server dedicated for streaming, or a server functioning as a web (Web) server as well.

The DASH segment streamer 31 further transmits segments of a predetermined stream to the IPTV clients 33 as a request source via the CDN 34 in response to a request for the segments of the corresponding stream transmitted from the IPTV clients 33 (33-1, 33-2, and up to 33-N) via a CDN 14. In this case, the IPTV clients 33 select and request a stream having an optimum rate in accordance with the state of the network environment where each client is present, with reference to a value of a rate described in an MPD (Media Presentation Description) file.

The DASH MPD server 32 is a server which generates an MPD file used for acquiring DASH segments generated by the DASH segment streamer 31. The MPD file is generated based on content metadata received from a content management server (not shown in FIG. 31), and an address (url) of the segments generated by the DASH segment streamer 31.

According to the MPD format, respective attributes are described by utilizing elements called representations (Representations) for each of streams such as video streams and audio streams. For example, a rate is described in an MPD file for each of representations separated in correspondence with a plurality of video data streams having different rates. The IPTV clients 33 are capable of selecting an optimum stream in accordance with the respective network environments where the IPTV clients 33 are present, with reference to the values of the rates as discussed above.

FIGS. 32A-32D illustrate an example of relationships between respective structures disposed in the foregoing MPD file in a hierarchical manner. As illustrated in FIG. 32A, there exist a plurality of periods (Periods) sectioned at time intervals in a media presentation (Media Presentation) as the whole MPD file. For example, an initial period starts from 0 second, while a subsequent period starts from 100 seconds.

As illustrated in FIG. 32B, a period contains a plurality of representations (Representations). The plurality of representations include representation groups grouped in accordance with adaptation sets (AdaptationSets) described above, and associated with video data streams having different stream attributes, such as rates, and containing identical contents.

As illustrated in FIG. 32C, a representation includes a segment info (SegmentInfo). As illustrated in FIG. 32D, this segment info includes an initialization segment (Initialization Segment), and a plurality of media segments (Media Segments) each of which describes information on a corresponding segment (Segment) divided from a period. Each of the media segments includes information on an address (url) and the like for actually acquiring video and audio segment data and other segment data.

A stream is freely switchable between a plurality of representations grouped in accordance with adaptation sets. Accordingly, a stream having an optical rate is selectable in accordance with the network environment where each of the IPTV clients is present, wherefore continuous movie distribution is achievable.

Figure 33A:
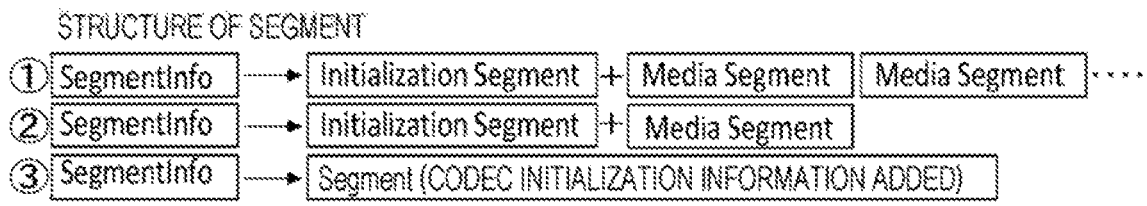
FIGS. 33A through 33C are views illustrating a structure of DASH specification stream segments.
Figure 33B:
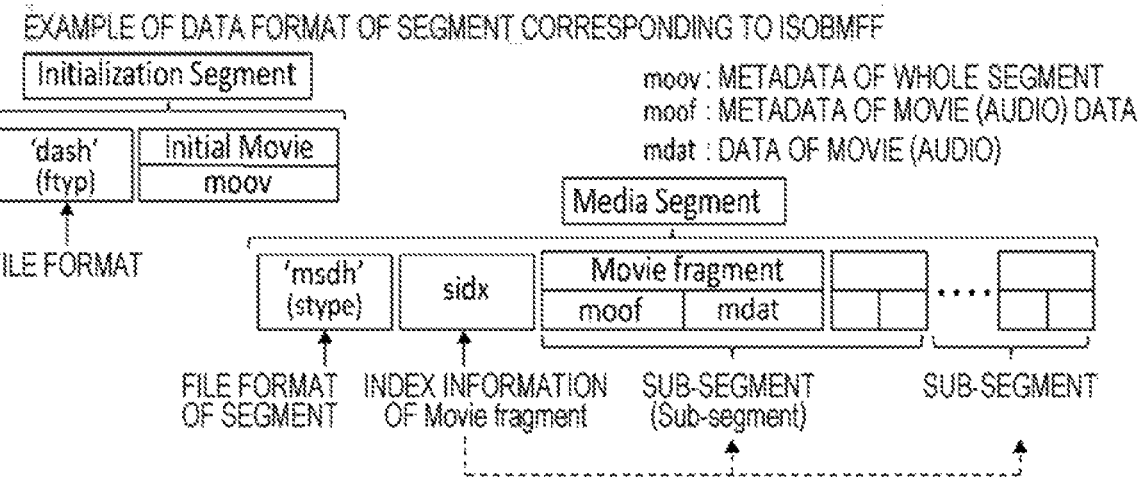
Figure 33C:
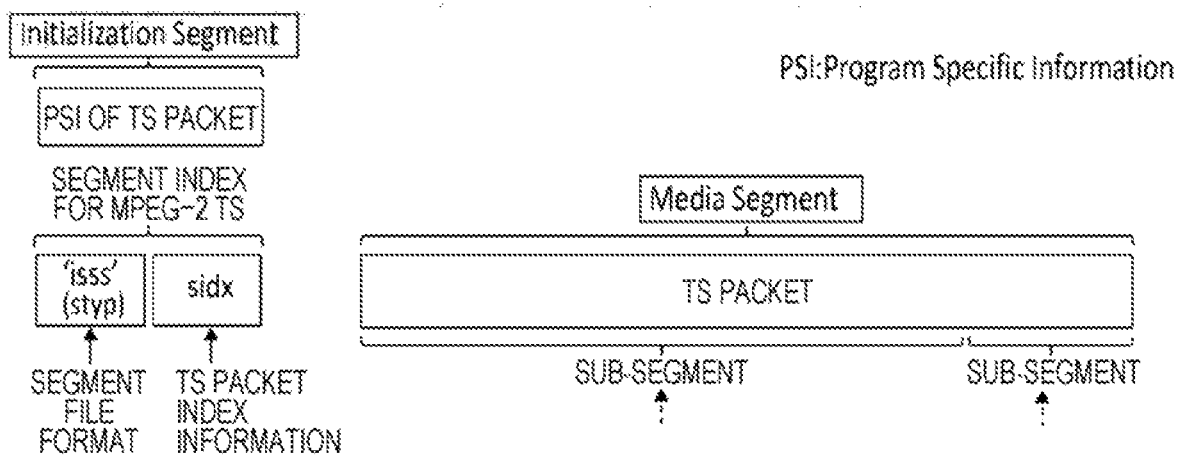

FIG. 33A illustrates a segment structure. Segments are dividable into three types based on differences of constituent elements. A first structure includes a plurality of "Media Segments" for storing fragmented movie data, in addition to codec initialization information "Initialization Segment". A second structure includes only one "Media Segment". A third structure includes a "Media Segment" integrated with the codec initialization information "Initialization Segment". FIGS. 33B and 33C illustrate examples of the data format of segments corresponding to ISOBMFF and MPEG-2TS when the structure including only one "Media Segment" is used.

When the present technology is applied to the MPEG-DASH base stream distribution system 30, a video stream into which a tone mapping information SEI message (Tone mapping information SEI message) and an HDR conversion SEI message (HDR conversion SEI message) have been inserted is disposed at the position of "Media Segment". In addition, an HDR simple descriptor (HDR_simple descriptor) or an HDR full descriptor (HDR_full descriptor), and a level mapping curve descriptor (level_mapping_curve descriptor) are disposed at the position of "Initialization Segment".

Figure 34:
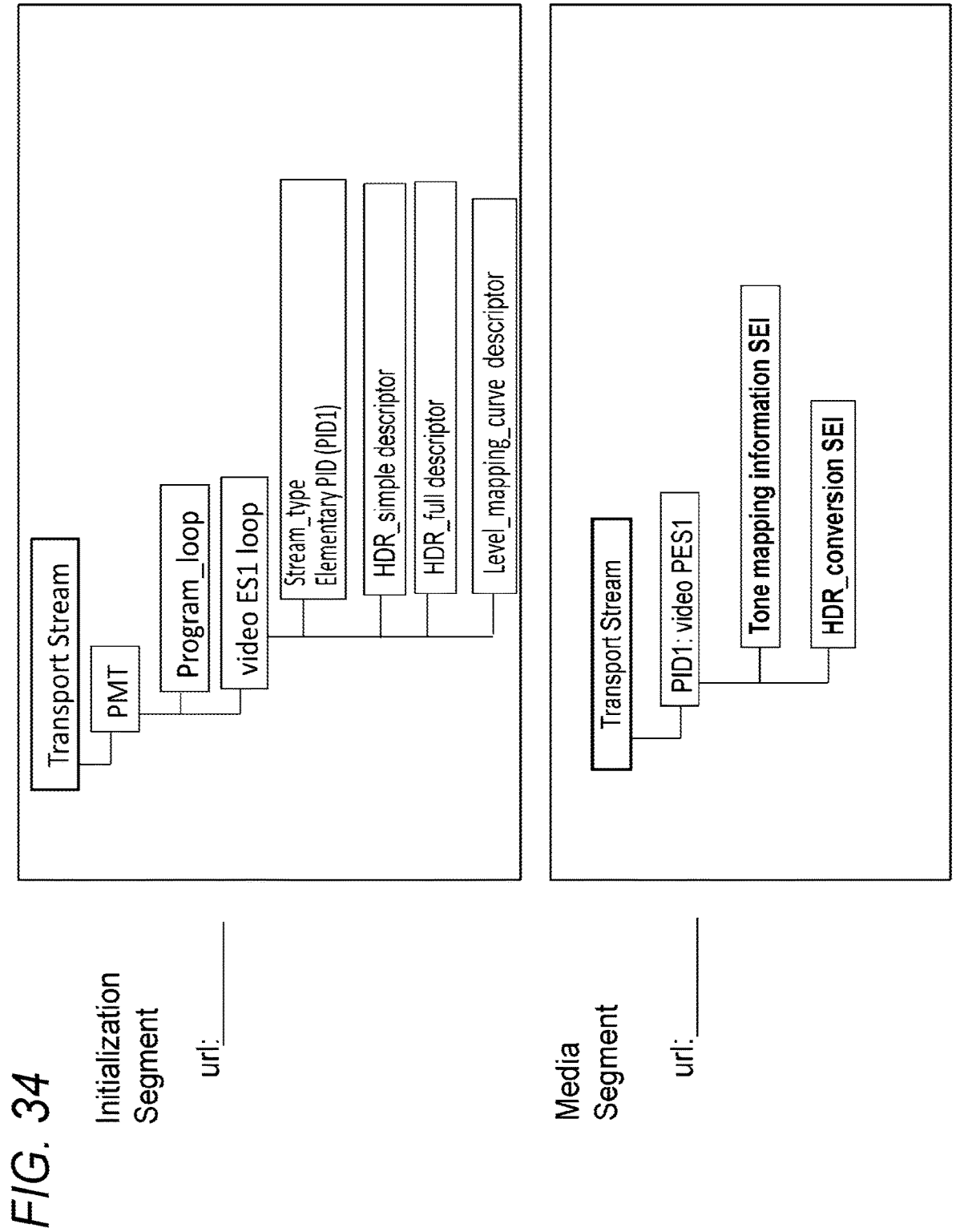
FIG. 34 is a view schematically illustrating information within a transport stream, which information corresponds to information contained in "Initialization Segment" and information contained in "Media Segment" in a segment data format corresponding to MPEG-2TS.

FIG. 34 schematically illustrates information within a transport stream, which information corresponds to the information contained in "Initialization Segment" and the information contained in "Media Segment" in the data format of segments corresponding to MPEG-2TS (see FIG. 33C). As described above, the IPTV clients 33 (33-1, 33-2 and up to 33-N) of the MPEG-DASH base stream distribution system 30 acquire "Initialization Segment" and "Media Segment" based on information on an address (url) present in the MPD file, and displays an image.

According to the stream distribution system 30 illustrated in FIG. 31, the SEI message containing gamma curve information and additional information for re-mapping is similarly inserted into a layer of a video stream. Moreover, a descriptor containing identification information indicating the presence or absence of insertion of the SEI message is inserted into a system layer (layer of container). Accordingly, the IPTV clients 33 are capable of executing processing in a similar manner to the manner of the receiving device 200 of the transmitting and receiving system 10 illustrated in FIG. 1.

[Application to MMT Structure Transmission Stream]

In recent years, MMT (MPEG Media Transport) structure has been attracting attention as a transport structure for next-generation broadcasting. This MMT structure is chiefly characterized by coexistence with an IP network. The present technology is also applicable to a transmitting and receiving system which handles this MMT structure transmission stream.

Figure 35:
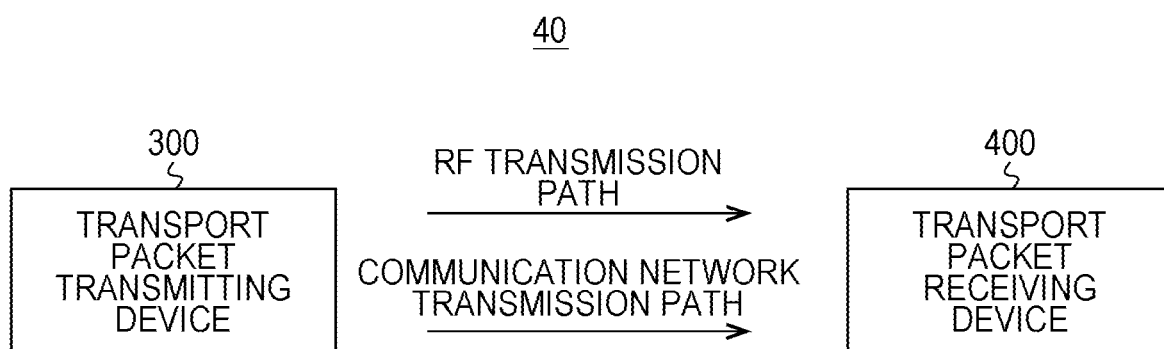
FIG. 35 is a block diagram illustrating a configuration example of a transmitting and receiving system which handles an MMT structure transmission stream.

FIG. 35 illustrates a configuration example of a transmitting and receiving system 40 which handles the MMT structure transmission stream. The transmitting and receiving system 40 includes a transport packet transmitting device 300, and a transport packet receiving device 400.

The transmitting device 300 generates a transport packet having MMT structure (see ISO/IEC CD 23008-1), i.e., a transmission stream containing an MMT packet, and transmits the generated transmission stream to the receiving side via an RF transmission path or a communication network transmission path. This transmission stream is a multiplex stream which includes a first MMT packet containing video and audio transmission media as a payload, and a second MMT packet containing information concerning transmission media as a payload, in a time sharing manner and at least in a size of a fragmented packet.

The receiving device 400 receives the foregoing transmission stream from the transmitting side via an RF transmission path or a communication network transmission path. The receiving device 400 processes transmission media extracted from the transmission stream by using a decode time and a display time acquired based on time information, so as to display an image and output a voice.

Figure 36:
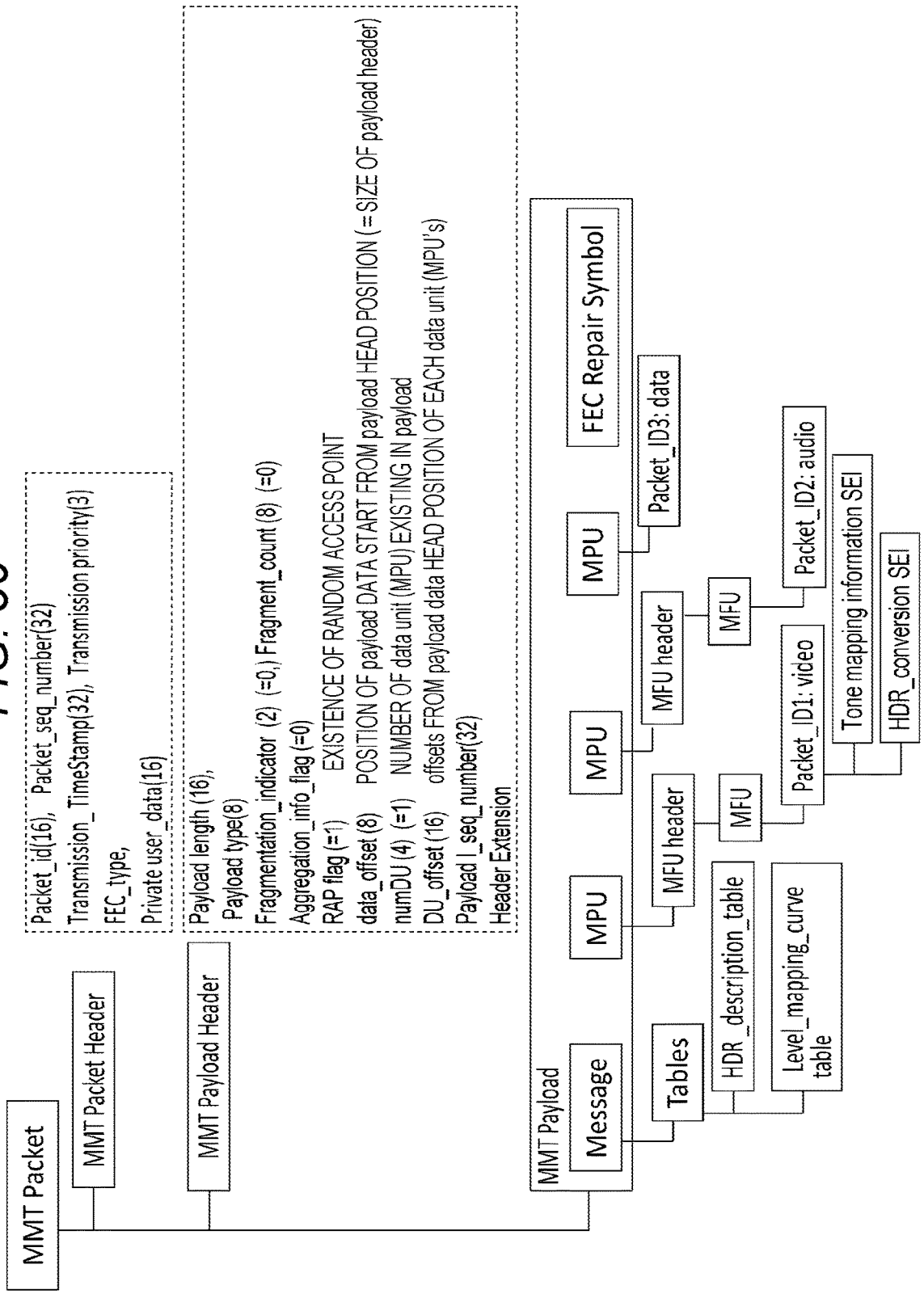
FIG. 36 is a view illustrating a configuration of an MMT packet in a tree form.

FIG. 36 illustrates a configuration of an MMT packet in a tree form. The MMT packet is constituted by an MMT packet header (MMT Packet Header), an MMT payload header (MMT Payload Header), and an MMT payload (MMT Payload). The MMT payload contains a message (Message), an MPU (Media Processing Unit), an FEC repair symbol (FEC Repair Symbol), and others. Signaling of these is executed based on a payload type (payload type) contained in the MMT payload header.

Various types of message contents are inserted into the message in a table form. The MPU is fragmented into subdivisions as MFUs (MMT Fragment Units) in some cases. In this case, an MFU header (MFU Header) is added to the head of each MFU. The MMT payload contains an MPU associated with video and audio media data, and an MPU associated with metadata. The MMT packet containing the respective MPUs is identifiable based on a packet ID (Packet_ID) existing in the MMT packet header.

When the present technology is applied to the transmitting and receiving system 40 which handles the MMT structure transmission stream, disposed as an MMT payload is such a video stream which contains insertion of tone mapping information SEI message (Tone mapping information SEI message) and an HDR conversion SEI message (HDR conversion SEI message). Moreover, defined is such a message which has an HDR description table (HDR description table) containing contents similar to the contents of the foregoing HDR simple descriptor (HDR simple descriptor) or HDR full descriptor (HDR_full 20 descriptor) and a level mapping curve descriptor (level_mapping_curve descriptor), for example.

FIG. 37 illustrates a structure example (Syntax) of an HDR description message (HDR description Message) having a HDR simple description table. A 16-bit field of "message_id" indicates that the structure is an HDR description message. An 8-bit filed of "version" indicates a version of this message. A 16-bit field of "length" indicates a length (size) of this message, showing a byte count of the subsequent part. This HDR description message contains an HDR simple description table (HDR simple description table).

FIG. 38 illustrates a structure example (Syntax) of an HDR simple description table. An 8-bit field of "table_id" indicates that the structure is an HDR simple description table. An 8-bit field of "version" indicates a version of this table. In this case, "table_id" and "version" are uniquely allocated in the system. A 16-bit field of "length" indicates a whole (size) of this table. A 16-bit field of "packet_id" is identical to "packet id" contained in the MMT packet header. This structure allows asset-level association.

A 1-bit field of "tone mapping SEI existed" is flag information which indicates whether or not tone mapping SEI information (gamma curve information) is present in a video layer (layer of video stream) similarly to the HDR simple descriptor (HDR_simple_descriptor) illustrated in FIG. 18. In this case, "1" indicates that the tone mapping SEI information is present, while "0" indicates that the tone mapping SEI information is absent.

Moreover, a 1-bit field of "HDR_conversion_SEI_existed" is flag information which indicates whether or not HDR conversion SEI information (additional information) is present in the video layer (layer of video stream) similarly to the HDR simple descriptor (HDR_simple_descriptor) illustrated in FIG. 18. In this case, "1" indicates that the HDR conversion SEI information is present, while "0" indicates that the HDR conversion SEI information is absent.

FIG. 39 illustrate another structure example (Syntax) of an HDR description message (HDR description Message) having an HDR description table. A 16-bit field of "message_id" indicates that the structure is an HDR description message. An 8-bit filed of "version" indicates a version of this message. A 16-bit field of "length" indicates a length (size) of this message, showing a byte count of the subsequent part. This HDR description message contains an HDR full description table (HDR full description table).

FIG. 40 illustrates a structure example (Syntax) of an HDR full description table. An 8-bit field of "table_id" indicates that the structure is an HDR simple description table. An 8-bit field of "version" indicates a version of this table. In this case, "table_id" and "version" are uniquely allocated in the system. A 16-bit field of "length" indicates a whole (size) of this table. A 16-bit field of "packet_id" is identical to "packet_id" contained in the MMT packet header. This structure allows asset-level association.

While not detailed herein, this HDR full description table contains "tone mapping SEI existed" and "HDR conversion SEI existed", and further information similar to the corresponding information of the HDR full descriptor (HDR full descriptor) illustrated in FIG. 20.

FIG. 41 is a view illustrating a configuration example of an HDR description message having a level mapping curve table. A 16-bit field of "message_id" indicates that the structure is an HDR description message. An 8-bit filed of "version" indicates a version of this message. A 16-bit field of "length" indicates a length (size) of this message, showing a byte count of the subsequent part. This HDR description message contains a level mapping curve table (Level_mapping_curve_table).

FIG. 42 illustrates a structure example (Syntax) of a level mapping curve table. An 8-bit field of "table_id" indicates that the structure is a level mapping curve table. An 8-bit field of "version" indicates a version of this table. In this case, "table_id" and "version" are uniquely allocated in the system. A 16-bit field of "length" indicates a whole (size) of this table. A 16-bit field of "packet_id" is identical to "packet_id" contained in the MMT packet header. This structure allows asset-level association.

While not detailed herein, information of "mapping curve table id", "number of levels N", "number of curve types C", and "curve data" are contained, similarly to the level mapping curve descriptor (level mapping curve descriptor) illustrated in FIG. 21.

As described above, the IPTV clients 33 (33-1, 33-2 and up to 33-N) of the MPEG-DASH base stream distribution system 30 acquire "Initialization Segment" and "Media Segment" based on information on an address (url) present in the MPD file, and displays an image. At this time, processing using the SEI message is achievable similarly to the receiving device 200 of the transmitting and receiving system 10 illustrated in FIG. 1.

According to the transmitting and receiving system 40 illustrated in FIG. 35, the SEI message containing gamma curve information and additional information for re-mapping is similarly inserted into the layer of the video stream. In addition, the description table containing identification information indicating the presence or absence of insertion of the SEI message is inserted into the system layer (layer of container). Accordingly, processing similar to the processing of the receiving device 200 of the transmitting and receiving system 10 illustrated in FIG. 1 is achievable by the transport packet receiving device 400.

The present technology may have the following configurations.

(1) A transmitting device including:
a processing unit that applies a gamma curve to input video data having a level range from 0% to 100%*N (N: a number larger than 1) to obtain transmission video data; and a transmission unit that transmits the transmission video data together with auxiliary information used for converting a high-luminance level on a receiving side.

(2) The transmitting device according to (1) noted above, wherein
the transmission unit transmits a container in a predetermined format that contains a video stream obtained by encoding the transmission video data, and an auxiliary information insertion unit that inserts the auxiliary information into a layer of the video stream and/or a layer of the container is provided.

(3) The transmitting device according to (2) noted above, including an identification information insertion unit that inserts, into the layer of the container, identification information that indicates that the auxiliary information has been inserted into the layer of the video stream.

(4) The transmitting device according to any one of (1) through (3) noted above, wherein the processing unit further executes a process for converting a level of output video data obtained by applying the gamma curve to the input video data, which level corresponds to a level of the input video data in a range from 100% to 100%*N, into a level corresponding to 100% of the input video data so as to obtain the transmission video data.

(5) The transmitting device according to (4) noted above, wherein the auxiliary information contains information on a filter applied to pixel data of the transmission video data at a level corresponding to 100% of the input video data.

(6) The transmitting device according to claim any one of (1) through (3) noted above, wherein the processing unit further executes a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data so as to obtain the transmission video data.

(7) The transmitting device according to (6) noted above, wherein the auxiliary information contains information on a filter applied to pixel data of the transmission video data in a range from the threshold to a level corresponding to 100% of the input video data.

(8) The transmitting device according to (6) noted above, wherein the auxiliary information contains information on a conversion curve applied to pixel data of the transmission video data in a range from the threshold to a level corresponding to 100% of the input video data.

(9) The transmitting device according to any one of (1) through (3) noted above, wherein the processing unit uses output video data as the transmission video data without a change, which output video data is obtained by applying the gamma curve to the input video data.

(10) The transmitting device according to (9) noted above, wherein the auxiliary information contains information on a conversion curve applied to a high-level side of the transmission video data.

(11) A transmitting method including:
a processing step that applies a gamma curve to input video data having a level range from 0% to 100%*N (N: a number larger than 1) to obtain transmission video data; and
a transmission step that transmits the transmission video data together with auxiliary information used for converting a high-luminance level on a receiving side.

(12) A receiving device including: a reception unit that receives transmission video data obtained by applying a gamma curve to input video data having a level range from 0% to 100%*N (N: a number larger than 1); and
a processing unit that converts a high-level side level range of the transmission video data such that a maximum level becomes a predetermined level based on auxiliary information received together with the transmission video data.

(13) The receiving device according to (12) noted above, wherein the predetermined level is determined based on information on the N and information on a luminance dynamic range of a monitor contained in the auxiliary information.

(14) The receiving device according to (12) or (13) noted above, wherein
the transmission video data is video data obtained by further executing a process for converting a level of output video data obtained by applying the gamma curve to the input video data, which level corresponds to a level of the input video data in a range from 100% to 100%*N, into a level corresponding to 100% of the input video data, and the processing unit converts levels of respective pixel data corresponding to 100% of the input video data into levels in a range from a level corresponding to 100% of the input video data to the predetermined level by applying a filter specified in filter information contained in the auxiliary information.

(15) The receiving device according to (12) or (13) noted above, wherein
the transmission video data is video data obtained by further executing a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data, and
the processing unit converts levels of respective pixel data of the transmission video data in a range from the threshold to a level corresponding to 100% of the input video data into levels in a range from the threshold to the predetermined level by applying a filter specified in filter information contained in the auxiliary information.

(16) The receiving device according to (12) or (13) noted above, wherein
the transmission video data is video data obtained by further executing a process for converting a level of output video data obtained by applying the gamma curve to the input video data, which level corresponds to a level of the input video data in a range from a threshold equal to or lower than a level corresponding to 100% to 100%*N, into a level in a range from the threshold to a level corresponding to 100% of the input video data, and
the processing unit converts levels of respective pixel data of the transmission video data in a range from the threshold to a level corresponding to 100% of the input video data into levels in a range from the threshold to the predetermined level by applying conversion curve information contained in the auxiliary information.

(17) The receiving device according to (12) or (13) noted above, wherein
the transmission video data is output video data without a change, which output video data is obtained by applying the gamma curve to the input video data, and the processing unit converts levels of respective pixel data of the transmission video data in a range from 10 a threshold equal to or lower than a level corresponding 100% of the input video data to a level corresponding to 100%*N of the input video data into levels in a range from the threshold to the predetermined level corresponding to L %*100 (L: a number equal to or smaller than N) of the input video data by applying conversion curve information contained in the auxiliary information.

(18) A receiving method including: a reception step that receives transmission video data obtained by applying a gamma curve to input video 20 data having a level range from 0% to 100%*N (N: a number larger than 1); and
a processing step that converts a high-level side level range of the transmission video data such that a maximum level becomes a predetermined level based on auxiliary information received together with the transmission video data.

The present technology is chiefly characterized in that transmission video data obtained by applying a gamma 30 curve to input video data with HDR is transmitted together with auxiliary information (filter information and conversion curve information) used for converting a high-luminance level on the receiving side so as to realize display with an appropriate luminance dynamic range on the receiving side (see FIG. 10).

REFERENCE SIGNS LIST

10 Transmitting and receiving system
30 Stream distribution system
31 DASH segment streamer
32 DASH MPD server
33-1 to 33-N IPTV client
34 CDN
40 Transmitting and receiving system
100 Transmitting device
101 Control unit
102 Camera
103 Color space conversion unit
104 Gamma processing unit
105 Video encoder
106 System encoder
107 Transmission unit
200 Receiving device
201 Control unit
202 Reception unit
203 System decoder
204 Video decoder
205 HDR processing unit
206 Color space conversion unit
207 Display unit
251 Clipping processing unit
252 Marking processing unit
253 Range mapping processing unit
300 Transport packet transmitting device
400 Transport packet receiving device

The invention claimed is:
1. A receiving device comprising:
receiver circuitry configured to
receive transmission video data via a transmission path, the transmission video data having a high dynamic range in which the transmission video data was processed by applying gamma characteristics to input video data;
circuitry configured to:
execute a conversion process on the transmission video data based on conversion characteristics information received together with the transmission video data to obtain converted video data in which the conversion characteristics information includes a type information indicating a type of conversion characteristics from a plurality of types of conversion characteristics;

convert a high-level side level range of the transmission video data such that a maximum luminance value of the converted video data becomes a level lower than a maximum luminance value of the received transmission video data based on auxiliary information received together with the transmission video data, the auxiliary information being extractable by the receiving device before processing the transmission video data in which the auxiliary information is included with each frame of the transmission video data; and a display having a luminance dynamic range determinable based on EDID of the display to be sent through HDMI;

wherein said auxiliary information includes a data field defining a luminance level of a monitor.

2. The receiving device of claim 1, comprising a memory containing the EDID, wherein the auxiliary information is received in every one or more slices of the transmission video data.

3. The receiving device of claim 2, wherein the receiver circuitry coupled to the memory and configured to receive the transmission video data obtained by applying the gamma characteristics to the input video data having a first luminance value range from a low luminance value to a first high luminance value, the transmission video data having a second luminance value range from the low luminance value to a second high luminance value having a smaller value than the first high luminance value.

4. The receiving device of claim 3, wherein the receiver circuitry is further configured to receive the transmission video data from a transport stream; and wherein the circuitry is further configured to:

execute a decoding process of the transmission video data, including extracting a supplemental enhancement information (SEI) message inserted into the transport stream;

convert the second luminance value range responsive to the auxiliary information; and convert a first color space of the transmission video data to second color space.

5. The receiving device of claim 4, wherein the auxiliary information is inserted as prefix information before portions of the transmission video data or suffix information after the portions of the transmission video data.

6. The receiving device of claim 5, wherein the circuitry is further configured to determine whether tone mapping SEI information and high dynamic range (HDR) conversion SEI information have been inserted into the transport stream.

7. The receiving device of claim 1, wherein the plurality of types of conversion characteristics correspond to C-shaped curves.

8. The receiving device of claim 7, wherein the C-shaped curves each have substantially the same maximum level of V_100*N in which N is greater than 1 and V_100 correlates to 100 cd/m$^2$.

9. The receiving device of claim 8, wherein the C-shaped curves each having different intermediate values.

10. The receiving device of claim 1, wherein the receiver circuitry is further configured to receive the transmission video data from a transport stream that is an MPEG-DASH based stream.

11. A display unit comprising:

receiver circuitry configured to receive transmission video data via a transmission path, the transmission video data having a high dynamic range in which the transmission video data was processed by applying gamma characteristics to input video data;

circuitry configured to:

execute a conversion process on the transmission video data based on conversion characteristics information received together with the transmission video data to obtain converted video data in which the conversion characteristics information includes a type information indicating a type of conversion characteristics from a plurality of types of conversion characteristics;

convert a high-level side level range of the transmission video data such that a maximum luminance value of the converted video data becomes a level lower than a maximum luminance value of the received transmission video data based on auxiliary information received together with the transmission video data, the auxiliary information being extractable by the display unit before processing the transmission video data in which the auxiliary information is included with each frame of the transmission video data; and a display having a luminance dynamic range determinable based on EDID of the display to be sent through HDMI;

wherein said auxiliary information includes a data field defining a luminance level of a monitor.

12. The display unit of claim 11, comprising a memory containing the EDID, wherein the auxiliary information is received in every one or more slices of the transmission video data.

13. The display unit of claim 12, wherein the receiver circuitry coupled to the memory and configured to receive the transmission video data obtained by applying the gamma characteristics to the input video data having a first luminance value range from a low luminance value to a first high luminance value, the transmission video data having a second luminance value range from the low luminance value to a second high luminance value having a smaller value than the first high luminance value.

14. The display unit of claim 13, wherein the receiver circuitry is further configured to receive the transmission video data from a transport stream; and wherein the circuitry is further configured to:

execute a decoding process of the transmission video data, including extracting a supplemental enhancement information (SEI) message inserted into the transport stream;

convert the second luminance value range responsive to the auxiliary information; and convert a first color space of the transmission video data to second color space.

15. The display unit of claim 14, wherein the auxiliary information is inserted as prefix information before portions of the transmission video data or suffix information after the portions of the transmission video data.

16. The display unit of claim 15, wherein the circuitry is further configured to determine whether tone mapping SEI information and high dynamic range (HDR) conversion SEI information have been inserted into the transport stream.

17. The display unit of claim 11, wherein the plurality of types of conversion characteristics correspond to C-shaped curves.

18. The display unit of claim 17, wherein the C-shaped curves each have substantially the same maximum level of V_100*N in which N is greater than 1 and V_100 correlates to 100 cd/m².

19. The display unit of claim 18, wherein the C-shaped curves each having different intermediate values.

20. The display unit of claim 11, wherein the receiver circuitry is further configured to receive the transmission video data from a transport stream that is an MPEG-DASH based stream.

* * * * *